United States Patent
Maeda et al.

(10) Patent No.: US 9,535,216 B2
(45) Date of Patent: Jan. 3, 2017

(54) OPTICAL WAVEGUIDE DRY FILM, AND OPTICAL WAVEGUIDE MANUFACTURING METHOD AND OPTICAL WAVEGUIDE USING OPTICAL WAVEGUIDE DRY FILM

(71) Applicant: PANASONIC INTELLECTUAL PROPERTY MANAGEMENT CO., LTD., Osaka (JP)

(72) Inventors: Shingo Maeda, Osaka (JP); Naoyuki Kondo, Osaka (JP); Shinji Hashimoto, Osaka (JP); Toru Nakashiba, Osaka (JP); Junko Kurizoe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/651,826

(22) PCT Filed: Sep. 22, 2014

(86) PCT No.: PCT/JP2014/004840
§ 371 (c)(1),
(2) Date: Jun. 12, 2015

(87) PCT Pub. No.: WO2015/045349
PCT Pub. Date: Apr. 2, 2015

(65) Prior Publication Data
US 2015/0331188 A1    Nov. 19, 2015

(30) Foreign Application Priority Data
Sep. 27, 2013  (JP) ................. 2013-202046

(51) Int. Cl.
*G02B 6/132* (2006.01)
*G02B 1/14* (2015.01)
(Continued)

(52) U.S. Cl.
CPC ................. *G02B 6/132* (2013.01); *G02B 1/14* (2015.01); *G02B 6/1221* (2013.01); *G02B 6/138* (2013.01); *G02B 2006/12069* (2013.01)

(58) Field of Classification Search
None
See application file for complete search history.

(56) References Cited

U.S. PATENT DOCUMENTS 8,351,752 B2    1/2013  Shibata et al.
9,245,765 B2 *  1/2016  Bieck .................. H01L 21/31
(Continued)

FOREIGN PATENT DOCUMENTS

JP    2000-147755    5/2000
JP    2003-195081    7/2003
(Continued)

OTHER PUBLICATIONS

International Search Report for PCT/JP2014/004840, dated Dec. 16, 2014.

*Primary Examiner* — Andrew Jordan
(74) *Attorney, Agent, or Firm* — Greenblum & Bernstein, P.L.C.

(57) ABSTRACT

The present invention relates to a dry film for an optical waveguide which has a carrier base material, a resin layer for an optical waveguide that can be cured by active energy ray or heat, and a protective film. The surface of the protective film that is in contact with the resin layer for an optical waveguide is a roughened surface.

12 Claims, 7 Drawing Sheets

(51) Int. Cl.
*G02B 6/122* (2006.01)
*G02B 6/138* (2006.01)
*G02B 6/12* (2006.01)

(56) References Cited

U.S. PATENT DOCUMENTS

| | | | |
|---|---|---|---|
| 2005/0023145 A1* | 2/2005 | Cohen | C25D 1/00 205/118 |
| 2009/0010604 A1 | 1/2009 | Shibata et al. | |
| 2009/0301893 A1* | 12/2009 | Cohen | C25D 1/00 205/131 |
| 2011/0315556 A1* | 12/2011 | Cohen | C25D 1/00 205/118 |
| 2012/0033913 A1 | 2/2012 | Kondou et al. | |
| 2014/0326607 A1* | 11/2014 | Cohen | C25D 1/00 205/128 |
| 2015/0308006 A1* | 10/2015 | Cohen | C25D 1/00 216/67 |
| 2015/0331188 A1* | 11/2015 | Maeda | G02B 6/132 385/131 |

FOREIGN PATENT DOCUMENTS

| | | |
|---|---|---|
| JP | 2007-119585 | 5/2007 |
| JP | 2009-104083 | 5/2009 |
| JP | 2009-104084 | 5/2009 |
| JP | 2009-169300 | 7/2009 |
| JP | 2009-258612 | 11/2009 |
| JP | 2010-091733 | 4/2010 |
| JP | 2010-175741 | 8/2010 |
| JP | 2010-230944 | 10/2010 |
| JP | 2011-117988 | 6/2011 |
| JP | 2012-159590 | 8/2012 |
| JP | 2012-168207 | 9/2012 |
| WO | 2007/102431 | 9/2007 |
| WO | 2009/116421 | 9/2009 |

* cited by examiner

OPTICAL WAVEGUIDE DRY FILM, AND OPTICAL WAVEGUIDE MANUFACTURING METHOD AND OPTICAL WAVEGUIDE USING OPTICAL WAVEGUIDE DRY FILM

TECHNICAL FIELD

The present invention relates to a dry film for an optical waveguide, an optical waveguide manufacturing method using the dry film, and an optical waveguide.

BACKGROUND ART

The so-called optical waveguides (also referred to as optical wirings and optical transmission paths) that transmit digital optical signals, rather than copper wirings which become very costly when accurate transmission of information is realized, have attracted much attention as a medium for short-distance ultrahigh-speed transmission inside the housings of electronic devices and apparatuses, such medium being capable to handle the explosive increase in the volume of transmitted information.

The optical waveguide, as referred to herein, is a structure in which a cladding material that is transparent at the wavelength of the light used and has a relatively low refractive index encloses the periphery of a linear transmission path formed from a core material with a relatively high refractive index, or is arranged above and below a planar transmission path. An optical fiber is an optical waveguide, but because the mounting density of a core in an optical fiber is difficult to increase, in terms of realizing a high density and ultrahigh-speed transmission at the same time, the most promising is a resin optical waveguide in which a plurality of linear cores or planar cores is formed inside a cladding layer by patterning performed by exposure of a plane. An optical waveguide having linear cores is called a ridge optical waveguide or a channel optical waveguide, and an optical waveguide having planar cores is called a slab optical waveguide or a planar optical waveguide.

Methods including spin coating or die coating of a resin which is liquid at room temperature on a base material and curing are known as means for realizing a resin optical waveguide by optical exposure, and since such methods are the simplest to implement at a laboratory level, a large number thereof have been developed, but in industrial implementation of such methods, problems are associated with the restriction placed on the size of the work and the reduction of thickness unevenness. Accordingly, optical wiring materials of the so-called dry film type are optimum for industrial production, and various types thereof have been developed.

A material for an optical waveguide of a dry film type is a product obtained by arranging at least an uncured resin for an optical waveguide which is solid at room temperature on a carrier base material (also referred to as carrier film, base film, and support film), and the processing thereof involves laminating the resin surface of the dry film for an optical waveguide on some planar body and then curing and patterning.

A protective film (also referred to as cover film, separator, or masking film) is often arranged on the surface of the resin for an optical waveguide on the side which is not in contact with the carrier base material with the object of protecting the resin for an optical waveguide. Where the surface of the resin for an optical waveguide is laminated on a certain planar body, the protective film needs to be peeled off and removed. Therefore, measures are usually taken to facilitate the peeling rather than to increase the adhesive force between the protective film and the resin for an optical waveguide. Further, in this case, where the protective film is peeled off, it is necessary that the peeling proceed at the interface of the resin for an optical waveguide and the protective film. Therefore, adhesion at this interface needs to be less than that at the interface of the carrier base material and the resin for an optical waveguide.

Several techniques for manufacturing an optical waveform from a resin material have been reported (see Patent Literatures 1 to 4). A dry film technique relating to a dry film for solder resist, coverlay, or etching resist has also been reported (Patent Literature 5).

However, Patent Literature 1 discloses a method for forming an optical waveguide by using a dry film of a structure which is constituted by a base film and a resin layer formed on the base film and in which a cover film of polyethylene or polypropylene is optionally laminated as a protective film on the opposite side of the base film, and the resin layer is sandwiched between the base film and the cover film. With respect to the cover film, only the material thereof is disclosed, and the roughness thereof is not described at all.

Patent Literature 2 discloses a manufacturing method for an optical waveguide in which a resin for forming a cladding layer which is formed on a base material is cured to form a lower cladding, a resin film for forming a core layer is laminated on the lower cladding layer to form a core layer, the core layer is exposed and developed to form a core pattern, and a resin for forming a cladding layer which is formed such as to embed the core pattern is cured to form an upper cladding layer. The resin for forming a core is specified to be in the form of a film, but the resin for forming a cladding may be also in the form of a film, and it is indicated that where the resin films for core and cladding are both used to form resin layers on a support film which is not to be eventually used for a base material of an optical waveguide, that is, when the support film needs to be peeled off and removed from the resin layer, it is preferred that the support film be not subjected to matting treatment such as corona treatment and sandblasting for increasing the adhesive force between the support film and the resin layer, or adhesive treatment such as coating of an easy-adhesion resin.

Patent Literature 3 discloses a method for manufacturing an optical-electrical composite substrate in which an electric wiring substrate provided with a lower cladding layer is obtained, and a core pattern and an upper cladding layer are successively formed on the lower cladding layer thereby configuring an optical waveguide. It is also indicated that a resin for forming a cladding layer and a resin for forming a core layer are preferably used in the form of a film, a resin layer is formed on a base material film serving as a support that supports each resin film, PET (polyethylene terephthalate), polypropylene, or polyethylene is preferably used as the base material film, and mold parting treatment and antistatic treatment may be implemented to facilitate subsequent separation of the resin layer. It is further disclosed that a protective film may be bonded to the resin films for the core and cladding with consideration for film protection and winding ability when a roll-shaped configuration is produced, that a protective film similar to that in the example of the base material film can be used, and that mold parting treatment and antistatic treatment may be optionally implemented.

Patent Document 4 discloses a method for manufacturing a flexible optical waveguide in which a first cladding layer is formed, a resin film for forming a core layer is laminated on at least one end portion on top of the first cladding layer to form a first core layer, a resin film for forming a core layer is laminated over the entire surface of the first core layer and the first cladding layer to form a second core layer, the first core layer and the second core layer are patterned to form a core pattern of an optical waveguide, and a second cladding layer is formed on the core pattern and the first cladding layer to embed the core pattern. It is also indicated that the base material of the resin film for forming a cladding layer, for example, may be subjected to physical or chemical surface treatment such as oxidation and roughening to improve adhesivity with the resin for forming a cladding layer, corona treatment, chromium oxide treatment, flame treatment, hot air treatment, ozone and UV treatment are presented as examples of oxidation methods, and the so-called bonding treatment such as sandblasting and solvent treatment are presented as examples of roughening. Since the base material film of the resin film for forming a cladding layer is eventually positioned for use on the outermost surface of the flexible optical waveguide, it is preferred that the abovementioned surface treatment be performed to obtain better adhesivity with the cladding resin. Meanwhile, although an example is also disclosed in which the base material film is peeled off and removed from at least one side to reduce the thickness of the flexible optical waveguide, or the base material film is peeled off from both sides to reduce buckling of the flexible optical waveguide, in the disclosed method, humidification is performed under high-temperature and high-humidity conditions with the object of easily peeling off the base material film and the adhesion between the base material film and the resin for cladding is reduced to facilitate peeling, on the basis of the aforementioned presumption that higher adhesion between the base material film and resin for cladding is preferred. A structure is also disclosed in which a protective film (separator or masking film) is laminated, with the object of protecting the resin film or improving winding ability at the time of manufacture, on the resin film for forming a cladding layer and the resin film for forming a core layer on the surface of the resin films on the side opposite that of the base material film, and it is indicated that the protective film is preferably not subjected to the aforementioned bonding treatment to facilitate the peeling of the resin for forming a cladding and the resin for forming a core. It is further disclosed that the so-called vacuum lamination in which heating and pressurization are performed under a reduced pressure is preferred from the standpoint of improving adhesion and adaptability when the resin film for forming a core is laminated, and that the lamination is preferably performed using a roll laminator to prevent the inclusion of air bubbles between the first cladding layer and the core layer.

Patent Literature 5 discloses a photosensitive film for laminating on a printed wiring board, the photosensitive film being characterized in that the surface roughness of a protective film is equal to or greater than 0.5 μm as an arithmetic average roughness (Ra) in a measurement range with a cut-off value of 0.08 mm to 8 mm and an evaluation length of 0.4 mm to 40 mm, the photosensitive composition layer has flowability such that where a static load of 0.25 kg/mm$^2$ is applied to the photosensitive composition layer with a layer thickness of 2 mm at a temperature of 30° C., the film thickness change amount in a time period from after 10 sec to after 600 sec since the application of the load is within a range of 50 μm to 800 μm, the protective film imparts surface roughness to the photosensitive composition layer, and the surface roughness is maintained prior to the lamination on the printed wiring board and eliminated by the pressurization during the lamination. As described in paragraph [0002] of Patent Literature 5, with the so-called solder resist, a coverlay of a flexible printed wiring board, and an etching resist which is used in the formation of copper circuits of printed wiring boards, the resin needs to be fluidized to a high level in order to embed a conductive pattern in the resin, without air bubbles, but since the tackiness of the resin is thereby increased, protruding conductors cannot be sufficiently covered and the protective function of the film cannot be realized, or air bubbles remain inside the surface defects of the stretched copper laminated boards. The photosensitive film with the above-described properties serves to resolve such problems.

CITATION LIST

Patent Literature

Patent Literature 1: Japanese Unexamined Patent Publication No. 2003-195081.
Patent Literature 2: WO 2009/116421.
Patent Literature 3: Japanese Unexamined Patent Publication No. 2009-258612.
Patent Literature 4: Japanese Unexamined Patent Publication No. 2010-175741.
Patent Literature 5: Japanese Unexamined Patent Publication No. 2000-147755.

SUMMARY OF INVENTION

One aspect of the present invention relates to a dry film for an optical waveguide, including a carrier base material (A), a resin layer (B) for an optical waveguide that can be cured by active energy ray or heat, and a protective film (C), wherein a surface of the protective film (C) that is in contact with the resin layer (B) for an optical waveguide is a roughened surface.

In accordance with the present invention, an optical waveguide can be manufactured in which the residual fine air bubbles are minimized. Therefore, a waveguide loss in the optical waveguide can be reduced, the production yield can be increased, and reliability can be improved. Further, the steps for forming the cladding layer and the core layer can be implemented using the same device and the production cost of the optical waveguide can be reduced.

DESCRIPTION OF EMBODIMENTS

Figure 1:
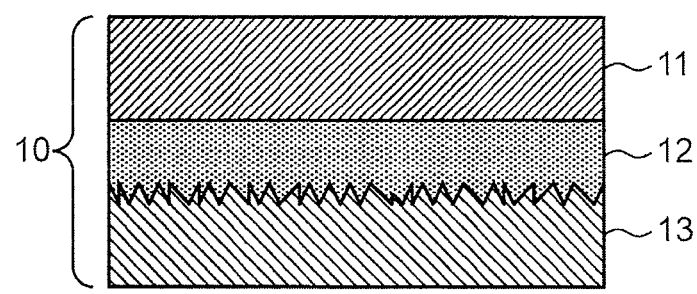
FIG. 1 is a cross-sectional schematic diagram illustrating the configuration of a dry film for a lower cladding which is a dry film for an optical waveguide according to an embodiment of the present invention.

When using a resin film for an optical waveguide which is in the form of the so-called dry film and suitable for a cladding and a core, the surface of the resin for an optical waveguide which is on the side opposite that of the carrier base material needs to be disposed on a planar body and laminated, and this is usually performed by vacuum lamination. However, a problem arising even when vacuum lamination is used is that fine air bubbles (air bubbles with a diameter from 5 μm to about 100 μm, when viewing the optical waveguide directly from above, such air bubbles being readily observable visually or under an optical microscope) remain after the lamination. An advantageous resin for an optical waveguide in the form of a dry film has suitable flexibility and suitable surface tackiness at least at a temperature at which the resin for an optical waveguide in the form of a dry film is disposed on a planar body, so that no cracking, resin separation, or powdering occurs in the resin for an optical waveguide during handling or so as to prevent the displacement which easily occurs due to slipping when the resin is disposed on the planar body. Further, where the surface of the resin for an optical waveguide in the form of a dry film is disposed on the planar body, the planar body and the resin surface are locally bonded to each other, bonded regions appear such that surround the air layers, and the air layers often eventually become residual air bubbles even after vacuum lamination.

Where fine air bubbles remain, a problem arising when they are present inside an optical waveguide core is that light passing through the core is reflected or scattered at the interface of the core resin and the air bubbles, which are a gas, and a loss in the optical waveguide is greatly increased. A problem arising when the air bubbles are present in a cladding close to the core, namely, within about 5 μm from the core, is that part of the transmitted light which seeps out from the core is scattered at the air bubbles which have a refractive index lower than that of the cladding (the refractive index of the classing is typically about 1.46 to 1.6, whereas the refractive index of the air is 1.0), and a loss in the optical waveguide is thereby greatly increased. A problem arising when the air bubbles are present inside the cladding at a distance from the core is that the portion including the air bubbles decreases the reliability of the optical waveguide or of an electric substrate including the optical waveguide, that is, the so-called optical-electrical composite substrate. Such decrease in reliability is due to the following reasons. In a reliability test in which moisture absorption is induced, moisture is accumulated in the air bubbles and causes fracture under heating, for example, in the subsequent reflow test. Further, where thermal stresses are applied in a temperature cycle test, stress concentration occurs at the air bubbles and causes fracture. Furthermore, where the air bubbles and via holes or through holes overlap in an optical-electrical composite substrate, that is, where the via holes pass through some of the air bubbles or get as close as 100 μm or less to the air bubbles, the connection reliability of such via holes decreases.

Further, in the case of a solder resist, a coverlay, and an etching resist which is typically used as a dry film, a single resin layer is sufficient to demonstrate the functions thereof. Therefore, the resin layer of a dry film is formed in a single layer on the surface of a printed wiring board. Meanwhile, a dry film material for an optical waveguide is required to form a lower cladding on a planar body, form a core thereon, and then form an upper cladding thereupon. Therefore, resin layers of the dry film material are laminated in a plurality of layers (multiple steps or multiple layers). The number of resin layers in the dry film material further increases when a core is formed in multiple layers. Where air bubbles are admixed to the lower cladding, core, and upper cladding, as mentioned hereinabove, the air bubbles degrade the performance of the optical waveguide and decrease reliability of an optical-electrical composite substrate. Even when the degree of air bubble presence in each layer of the lower cladding, core, and upper cladding is the same as that allowed when a solder resist, a coverlay, or an etching resist is formed on a printed wiring board, the occurrence probability of defects (failures) in an optical waveguide of a multilayer (for example, three-layer) configuration is obtained by adding up the defect occurrence probabilities in the layers of the lower cladding, core, and upper cladding. For this reason, in a dry film material for an optical waveguide, the presence of air bubbles in the layers of the lower cladding, core, and upper cladding needs to be greatly reduced with respect to that in the typical solder resist, coverlay, or etching resist.

In summary, the air bubbles not only decrease the production yield of optical waveguides manufactured by lamination, but also increase the production cost of optical waveguides because complex production steps and know-whow are required to prevent the air bubbles from remaining in the optical waveguide. Therefore, in order to enable industrial production of optical waveguides, dry film materials need to be improved to reduce greatly the presence of residual fine air bubbles in the optical waveguides.

The present invention has been created to resolve the abovementioned problems, and it is an objective of the present invention to provide a dry film for an optical waveguide that can minimize the fine air bubbles remaining in the optical waveguide, an optical waveguide manufacturing method using the dry film, and an optical waveguide.

The comprehensive research conducted by the inventors has demonstrated that the abovementioned problems can be resolved by a dry film for an optical waveguide which uses a protective film and in which a surface of the protective film which is in contact with a resin for an optical waveguide is a roughened surface, and a surface of the resin for an optical waveguide of the dry film from which the protective film is peeled off is a roughened surface reflecting the peeled-off surface of the protective film. The inventors have created the present invention by conducting further research on the basis of such results.

Embodiments of the present invention are described hereinbelow, but the present invention is not limited to the embodiments.

[First Embodiment]

A dry film for an optical waveguide according to the first embodiment of the present invention includes a carrier base material (A), a resin layer (B) for an optical waveguide that can be cured by active energy ray or heat, and a protective film (C), wherein a surface of the protective film (C) that is in contact with the resin layer (B) for an optical waveguide is a roughened surface.

With such a configuration, the fine air bubbles (air bubbles with a diameter from 5 μm to about 100 μm, when the optical waveguide is viewed directly from above, such air bubbles being readily observable visually or under an optical microscope) remaining inside an optical waveguide manufactured using the dry film of the present embodiment can be minimized, the waveguide loss of the optical waveguide and the spread thereof can be reduced, and reliability of the optical waveguide and reliability of electrical wiring of an optical-electrical composite substrate can be increased. A configuration example of the dry film of the present embodiment (dry film 10 for forming a lower cladding layer) is presented in the cross-sectional schematic diagram in FIG. 1. As depicted in FIG. 1, the dry film of the present embodiment (dry film 10 for forming a lower cladding layer) has a carrier base material 11, a resin layer 12 for an optical waveguide (lower cladding), and a protective film 13, and the surface of the protective film 13 that is in contact with the resin layer 12 for an optical waveguide (lower cladding) is a roughened surface. Constituent elements of the dry film of the present embodiment are described hereinbelow in greater detail.

The following numerical symbols are used in the drawings: 10—a dry film for an optical waveguide (lower cladding), 11, 31, 41—carrier base materials, 12—a resin layer for an optical waveguide (lower cladding), 13, 33, 43—protective films, 14—a lower cladding, 20—a planar body, 21—a planar body on which the lower cladding is formed, 22—a planar body on which the lower cladding and the core are formed, 30—a dry film for an optical waveguide (core), 32—a resin layer for an optical waveguide (core), 34—a core, 40—a dry film for an optical waveguide (upper cladding), 42—a resin layer for an optical waveguide (upper cladding), and 44—an upper cladding.

[Carrier Base Material (A)]

The carrier base material (A) is a carrier that is used to form a resin layer for an optical waveguide thereon and then transfer the resin layer for an optical waveguide to a planar body. It is preferred that a film- or sheet-shaped flexible carrier be used. The material of the carrier base material is not particularly limited, and suitable examples thereof include thermoplastic resins, cured products of thermosetting resins (resin films), metals, and inorganic materials (glass).

Examples of the thermoplastic resins include PET (polyethylene terephthalate), PP (polypropylene), PE (polyethylene), PEN (polyethylene naphthalate), PI (polyimides), COF (cycloolefin polymers), PA (polyamides), PAI (polyamide-imides), and LCP (liquid crystal polymers). Those polymers may be subjected to stretching in the film production step.

Examples of cured products of thermosetting resins include composite materials including a thermosetting resin and an inorganic filler (glass cloth, glass nonwoven fabric, glass powder) and flexible cured products of thermosetting resins obtained by selecting, as appropriate, the molecular structure of a thermosetting resin, or by selecting, as appropriate, an additive that can improve the flexibility of the cured product.

Examples of suitable metals include metal foils of a monolayer or multilayer structure, such as copper and aluminum foils, and composite materials obtained by forming a thin metal layer on the aforementioned thermoplastic resins or thermosetting resins.

The aforementioned materials can be selected, as appropriate, according to the process for manufacturing an optical waveguide or the application of the final product. Where the material of the carrier is a metal, the so-called peelable metal foil in which a metal foil with a thickness of 1 μm to 30 μm is laminated on a metal foil with a thickness of 20 μm to 100 μm (also referred to as "carrier foil"), with a peeling layer being interposed therebetween, may be used as the carrier base material.

The advantages of the carrier base material (A) made of a resin film include flexibility of the carrier base material (A)

itself, ability to control the surface state within a wide range, and low cost. Where the carrier base material (A) is a metal foil, in particular, by using a dry film in which a thermally curable cladding for embedding an optical waveguide core therein (also referred to as upper cladding or second cladding) is used as the resin layer (B) for an optical waveguide, it is possible to form, as necessary, a metal wiring circuit, for example, by etching the carrier base material (A), that is, the metal foil, remaining after the optical waveguide is formed. Such a carrier base material is advantageous when an optical-electrical composite wiring board is manufactured.

Where a method is used by which the dry film of the present embodiment is laminated on the below-described planar body, the dry film is then irradiated with active radiation through the carrier base material, and the resin layer (B) for an optical waveguide is cured, it is preferred that the carrier base material of high transparency be used. In this case, the transmissivity of the carrier base material at a wavelength of the radiated active energy rays may be equal to or higher than 85%, more preferably equal to or higher than 90%.

Where a process is used (exposure step when the so-called patterning is performed) by which local irradiation with active energy rays is performed through the carrier base material by mask exposure or laser beam scanning and the resin layer (B) for an optical waveguide is locally cured, in order to suppress the roughening (a state in which the side surfaces of the pattern have depressions and protrusions instead of being smooth) of edges of the cured product pattern, that is, the pattern that appears after the subsequent development step performed to remove the unexposed portions, it is preferred that the carrier base material have an extremely small surface roughness and no surface defects and that the size of a particulate matter (air bubbles and fine organic and inorganic particles) contained inside the carrier base material and having a different refractive index be as small as possible and the content thereof be small. In this case, it is preferred that the surface roughness (the meaning thereof is explained hereinbelow) of the carrier base material be equal to or less than 0.1 μm when represented by an arithmetic average roughness (SRa) and equal to or less 2 μm when represented by a ten-point average roughness (SRz), more preferably equal to or less than 0.06 μm when represented by the arithmetic average roughness (SRa) and equal to or less 1 μm when represented by the ten-point average roughness (SRz). The average particle size of the particulate matter is preferably equal to or less than 1 μm, more preferably equal to or less than 0.5 μm, and most preferably equal to or less than 0.1 μm.

The numerical value of the surface roughness in the present description is obtained by roughness analysis using a scanning confocal laser microscope, rather than a probe, so that the surface roughness of the below-described resin layer (B) for an optical waveguide also could be represented. Where a fine roughness is determined in probe-type surface roughness measurements, a load of 0.75 mN (about 0.0765 gf) is typically applied with a probe having a tip radius of 2 μm. A load applied to a measurement object is about 600 kgf per 1 $cm^2$ where the contact surface area with the measurement object is defined by a radius of 2 μm and about 2400 kgf per 1 $cm^2$ where the contact surface area is defined by a radius of 1 μm, such a force causes deformation of a soft resin, and the surface roughness cannot be measured accurately. Therefore, the surface roughness needs to be measured by a contactless method. In the present embodiment, a scanning confocal laser microscope is used and the measurements can be performed under the following conditions.

Device used: Olympus Co., scanning confocal laser microscope LEXT OLS3000.

Objective lens magnification: ×100.

Roughness analysis mode: surface roughness.

Parameter set: JIS 1994.

Cut-off λc: not indicated.

Minimum height identification: cross-sectional curve: 10% of Pz, roughness curve: 10% of Rz, waviness curve: 10% of Wz.

Minimum length identification: 1% of standard length (image view).

SRa obtained as a result is an arithmetic average roughness, SRz is a ten-point average roughness; in the description hereinbelow the roughness can be represented by SRa and SRz.

Further, in the present description, active energy rays represent an electromagnetic wave having a wavelength equal to or lower than the visible region, more specifically, visible light with a wavelength from 700 nm to 400 nm, UV radiation from 400 nm to about 2 nm, and X-rays with a shorter wavelength. Typically, an infrared laser beam of a carbon dioxide gas laser generating laser radiation with a wavelength of 9.4 μm to 10.6 μm can be referred to as active energy rays, but in the present description the active energy rays are defined only as an electromagnetic wave with a wavelength equal to or less than 700 nm and does not include infrared laser radiation. The reason for such a definition is that where the light wavelength is longer than that of the visible light, a curing initiator of a photocuring type, which causes the resin to cure, essentially cannot be activated by such electromagnetic waves.

In the present embodiment, the thickness of the carrier base material is not particularly limited, provided that it is within a range such that properties and flexibility required in each step from production to use of the dry film can be obtained. The preferred thickness is typically 9 μm to 200 μm. The thickness less than 9 μm is undesirable because handleability is degraded. Thus, the carrier base material can be easily wrinkled, the strength is decreased and the dry film can be easily ruptured, and elongation is increased by tension applied in the processing step when the resin film for an optical waveguide is formed thereon. Conversely, the thickness of more than 200 μm is undesirable because cost and product weight are increased, active energy rays are absorbed or scattered by the carrier base material when the resin for an optical waveguide is cured by the active energy rays through the carrier base material, and the rigidity of the carrier base material becomes too high, thereby degrading handleability in a step for producing the dry film for an optical waveguide and a step for using the same. Where the carrier base material is constituted by a monolayer material, the thickness of the carrier base material is more preferably 15 μm to 100 μm, and still more preferably 30 μm to 75 μm.

The surface state of the carrier base material may differ between the case in which the carrier base material remains on the optical waveguide in the final product and the case in which the carrier base material is removed in the optical waveguide manufacturing process and does not remain on the optical waveguide in the final product.

Thus, when the carrier base material remains on the optical waveguide in the final product, a strong adhesive force is required between the carrier base material and the resin layer which is in contact with the carrier base material and constitutes the optical waveguide. Therefore, in this case, it is preferred that the surface of the carrier base material be subjected to adhesion imparting treatment such as treatment that generates functional groups on the surface, e.g., plasma treatment or corona treatment, treatment that forms surface unevenness, e.g., sandblasting, chemical etching, or stretching in the case where different crystal phases are commonly present in an olefin polymer, and treatment in which the surface of the carrier base material is coated with a substance demonstrating high adhesivity to both the cured resin product for an optical waveguide and the carrier base material (also referred to as easy-adhesion treatment or priming). However, for example, where the carrier base material is used as a cladding on one side of an optical waveguide, the surface of the carrier base material is required to be smooth, have high transparency at a wavelength of the light propagating in the optical waveguide core, and have a refractive index lower than that of the core. In this case, in order to improve the adhesion between the resin for the core and the resin for the upper cladding, it is preferred that the surface be treated with plasma or subjected to the so-called priming which involves coating a thin layer of a coupling agent or a resin with a high adhesive force.

Meanwhile, where the carrier base material is removed in the optical waveguide manufacturing process and does not remain on the optical waveguide in the final product, a carrier base material with a high surface smoothness such that minimizes the so-called anchor effect may be used so that the carrier base material could be easily peeled off from the uncured or cured resin for an optical waveguide. In this case, it is preferred that SRa be equal to or less than 0.1 μm and SRz be equal to or less than 2 μm, and it is even more preferred that SRa be equal to or less than 0.06 μm and SRz be equal to or less than 1 μm. If necessary, the surface of the carrier base material may be subjected to the so-called parting treatment involving coating or adsorption of a fluororesin, a silicone resin, or various organosilane compounds.

A PET film with a product number A4100, which is produced by Toyobo, is an example of commercially produced carrier base material of this type. This film is subjected to easy-adhesion treatment on one side and untreated on the other side. The measured values of surface roughness on the untreated surface are SRa=0.03 μm and SRz=0.7 μm. A PET film with a product number T60, which is produced by Toray Industries, Inc., is another example of the commercial product. The measured values relating to the surface of this film which has a small surface roughness are SRa=0.04 μm and SRz=1.9 μm.

As has already been mentioned hereinabove, where the protective film is peeled off from the resin layer for an optical waveguide, it is always necessary that the peeling proceed at the interface of the resin for an optical waveguide and the protective film, regardless of the surface state of the carrier base material. Therefore, the adhesion at the interface of the carrier base material and the resin for an optical waveguide is required to be higher than that at the interface of the protective film and the resin for an optical waveguide.

[Resin Layer (B) for Optical Waveguide which is Curable by Active Energy Rays or Heat]

The resin layer (B) for an optical waveguide which is curable by active energy rays or heat serves as a member constituting the optical waveguide (cladding, core), and any resin material can be used therefor provided that the cured product which is cured with active energy rays or heat has high transparency at the wavelength of light which carries a signal inside the optical waveguide (abbreviated hereinbelow as "waveguide wavelength") and that the dry film form can be realized.

Since this is a resin layer for eventually forming an optical waveguide, both the resin composition for an optical waveguide core and the resin composition for an optical waveguide cladding are required to have high transparency, and resin compositions having a transparency equal to or lower than 0.1 dB/cm at a waveguide wavelength of 840 nm to 860 nm, a transparency equal to or lower than 0.3 dB/cm at a waveguide wavelength of 990 nm to 1010 nm, and a transparency equal to or lower than 0.5 dB/cm at a waveguide wavelength of 1300 nm to 1330 nm are preferred, those values being obtained by using a spectrophotometer to measure a transmission loss in the thickness direction in a portion which has a smooth surface and no defects such as air bubbles in a product obtained by curing the resin composition to obtain a plate-like shape with a thickness of 2 mm to 3 mm. It is undesirable that the transparency be above those values because the optical waveguide loss increases, large electrical power is consumed to increase the output of the laser radiation source in order to transmit information in the optical waveguide, or the distance through which information transmission can be performed in the optical waveguide is reduced.

Concerning the refractive indexes of the cured products of the resin compositions, the resin composition for the core is required to have a refractive index at the waveguide wavelength which is higher than the refractive index of the resin composition for the cladding, and it is preferred that the refractive indexes be set such that a numerical aperture (abbreviated hereinbelow as NA), which is represented by a square root of a computation result obtained by subtracting a second power of the refractive index of the cladding from the second power of the refractive index of the core, becomes 0.1 to 0.5. Where the NA is less than 0.1, it is less than the NA of a single-mode (SM) fiber which is an optical fiber that is typically used in long-distance optical transmission. This is undesirable because the following problems are encountered. Thus, a coupling loss is generated during optical coupling to the optical fiber, a loss in a bent portion formed when the waveguide core is arranged by curving in a plane is increased, and the NA value spreads and is unstable because the difference in refractive index between the core and the cladding is too small. Conversely, it is undesirable that the NA be greater than 0.5 because the spread angle of the light in a portion where the light exits from the optical waveguide toward a light-receiving element is increased, thereby increasing the signal light seeping out from the light-receiving portion of the light-receiving element and thus increasing the coupling loss.

Examples of resin materials suitable for the resin layer (B) for an optical waveguide include a resin of an epoxy curable system, a resin of an acrylic curable system, a resin of a cyanate ester curable system, an oxetane resin system, a vinyl ether resin system, an urethane resin system, a resin using a combination thereof, and a resin of a silicone curable system. Since any of those materials is to be used as a member constituting an optical waveguide, the cured products thereof are obviously required to have high transparency.

The resin of an epoxy curable system, as referred to herein, means a composition including a resin of a curable system in which a ring-opening reaction of epoxy groups, that is, functional groups of a three-membered ring structure constituted by two carbon atoms and one oxygen atom, is initiated by active energy rays or heat in the presence of a certain curing initiator and the resin can eventually be three-dimensionally crosslinked. The resin may also include in combination other curable systems, for example, a curable system which is three-dimensionally crosslinked by a ring-opening reaction of a four-membered ring functional group which is called oxetane and constituted by three carbon atoms and one oxygen atom and a curable system in which a compound having polymerizable carbon-carbon double bonds is three-dimensionally crosslinked (in either case, the reaction proceeds under irradiation with active energy rays or heat in the presence of a curing initiator).

The contents and compositions disclosed in Japanese Unexamined Patent Publications No. 2007-119585, 2009-104083, 2009-104084, and 2010-230944 illustrate advantageous examples of epoxy curable resins.

Epoxy resin raw materials that are used for epoxy resin compositions are compounds that have an epoxy group, and because such compounds need to be cured, the composition includes compounds having two or more epoxy groups in a molecule. Epoxy resin raw materials have various molecular weights and epoxy equivalents, and a wide variety thereof is available, from those having a molecular weight of 168 and an epoxy equivalent less than 93.5, as 1,2,8,9-diepoxylimonene (a bifunctional aliphatic epoxy marketed by Daicel Chemical Industries Co., Ltd. under a trade name of CELLOXIDE 3000) to those having a molecular weight equal to or higher than 40,000 and an epoxy equivalent equal to or higher than about 7000 as a high-molecular-weight epoxy resin (synthesized from epichlorohydrin and bisphenol) which is also called a phenoxy resin or a phenoxy polymer. The epoxy resin raw material which is to be used in the present embodiment can be selected, as appropriate, such as to obtain the desirable levels of handleability, processability, and curing ability, such as tackiness, powdering ability, brittleness, melt viscosity, and softening temperature of the resin layer (B) for an optical waveguide, and properties of the cured product of the resin layer (B) for an optical waveguide, such as transparency, heat resistance, flexibility, toughness, refractive index, birefringence, linear expansion coefficient, and thermal conductivity. A curing agent and/or a curing initiator (curing catalyst) are needed to cure the epoxy resin raw material, but no restriction is placed thereon, provided that the curing agent and/or curing initiator used can realize high transparency in the cured product which is necessary for an optical waveguide.

The resin of an acrylic curable system, as referred to in the present embodiment, means a composition including a resin of a curable system which includes a polymer having a carboxyl group in a side chain, a monomer or an oligomer of a (meth)acrylic acid ester, and a certain curing initiator as the necessary components, in which a polymerization reaction is initiated by active energy rays or heat, and such that the eventually obtained resin is insoluble in solvents and alkaline liquids. The contents and compositions disclosed in Japanese Unexamined Patent Publications No. 2009-169300, 2010-091733, and 2011-117988 illustrate the advantageous specific examples of such resins.

The resin of a cyanate ester curable system, as referred to in the present embodiment, means a resin of a curable system in which —OCN groups react with each other in the presence of a curing initiator (catalyst) to generate six-membered triazine rings, or where an epoxy resin is used in combination, to generate an oxazoline ring, rather than the triazine ring, and the resin is three-dimensionally crosslinked. The contents and compositions disclosed in Japanese Unexamined Patent Publication No. 2012-159590 illustrate advantageous examples.

The silicone curable system, as referred to in the present embodiment, is a resin of a curable system which is three-dimensionally crosslinked when an addition reaction (hydrosilylation) is initiated between silicon-hydrogen and carbon-carbon double bonds in the presence of a catalyst.

A method for forming the resin layer (B) for an optical waveguide is not particularly limited, but a method in which a resin composition constituting the resin layer (B) for an optical waveguide is coated on the carrier base material (A) such as described hereinabove and heated is preferred. More specifically, where a mixture including all of the resin composition raw materials is liquid at room temperature, a method can be used by which the resin composition is coated as is, and then a curing reaction is advanced to a certain degree by heating and a solid form is obtained at room temperature, thereby producing the so-called B-stage state. Where a mixture including all of the resin composition raw materials is solid at room temperature, a method by which the resin composition raw materials are dissolved in a solvent and the solution is coated and dried, or a method by which a transition to the B stage is induced, as necessary, by heating during drying can be used. A typical method that can continuously form, on an industrial scale, a dry coating film or a B-stage coating film with a thickness form several micron to several hundreds of micros, such that uses a die coater, a slit coater, a lip coater, a comma coater, and a gravia coater, can be used for the aforementioned coating.

As for the thickness of the resin layer (B) for an optical waveguide in the present embodiment, it is preferred that the resin layer in the portion that eventually becomes the optical waveguide core have a thickness of about 5 μm to 100 μm. In the core of a ridge optical waveguide, the cross section perpendicular to the propagation direction of optical signals typically has a substantially square shape, and the thickness of the resin layer in the portion that becomes the optical waveguide core typically substantially corresponds to the core height and is substantially equal to the width of the optical waveguide core which is formed by a method by which the desired shape is obtained by local exposure and subsequent development (referred to as photolithography or photolitho, or simply patterning). Therefore, it is undesirable that the thickness of the resin layer (B) for an optical waveguide in the portion that becomes the optical waveguide core be less than 5 μm, because such a thickness leads to the following problems: the cross-sectional size of the core becomes too small, a coupling loss with a light-emitting element or an optical fiber, which serves to couple the light to the waveguide, increases, and stable desired dimensions are difficult to obtain when a core pattern is formed with photolithography. Conversely, the thickness greater than 100 μm is undesirable because the following problems are encountered: the cross-sectional size of the core becomes too larger, a coupling loss with a light-receiving element or an optical fiber, which serves to couple the light to the waveguide, increases, and the thickness of the entire optical waveguide increases.

Meanwhile, concerning the thickness of the resin layer (B) for an optical waveguide, it is preferred that the resin layer (B) for an optical waveguide in the portion that eventually becomes the optical waveguide cladding have a thickness such that the thickness directly below or directly above the core be 5 μm to 100 μm when the optical waveguide is formed. It is undesirable that the thickness be less than 5 μm because the effect of confining the propagating light in the core is degraded and the optical waveguide loss is increased. It is also undesirable that the thickness be greater than 100 μM because, although no problem is associated with the waveguide loss, the thickness of the optical waveguide itself increases.

The resin layer (B) for an optical waveguide of the present embodiment may have a monolayer structure, that is, a dedicated single resin layer may be used for the lower cladding, core, and upper cladding, or a multilayer structure, that is, a structure in which the resin for the cladding and the resin for the core are laminated.

Where an optical waveguide is eventually formed with a monolayer core, the lower cladding stands for a cladding which is formed on the below-described planar body (D) and on which the core is formed; the lower cladding is also referred to as a lower-portion cladding, an under-cladding, a first cladding, or a 1st cladding. The upper cladding stands for a cladding that embeds the core of the ridge optical waveguide, or covers the top of the core of the slab optical waveguide. The upper cladding is also referred to as an upper-portion cladding, an over-cladding, a second cladding, or a 2nd cladding. Where the lower cladding and upper cladding are not strictly distinguished from each other and a multilayer (multistage) core is formed, the core is sometimes formed on the surface of the upper cladding. In such a case, the upper cladding for an underlayer core also serves as a lower cladding for an over-layer core.

(Protective Film (C))

One of the important specific features of the dry film for an optical waveguide of the present embodiment is the configuration of the protective film (C). In the conventional film material for an optical waveguide, the attention has been focused on peeling from the resin layer for an optical waveguide, and roughening of the protective film surface has not been investigated at all. In the present invention, it is established for the first time that by using a dry film in which the surface of the protective film is roughened, as appropriate, and the surface of the resin layer (B) from which the protective film (C) is peeled off is a rough surface reflecting the surface roughness of the protective film (C), it is possible to reduce the waveguide loss of the finally obtained optical waveguide when the dry film is laminated on the below-described planar body (D).

In the present embodiment, as has been mentioned hereinabove, the protective film (C) is generally used with the object of preventing the adhesion of foreign matter to and appearance of defects on the surface of the resin layer (B) for an optical waveguide, or with the object of improving winding ability after coating and drying the resin layer (B) for an optical waveguide. In the present embodiment, the protective film is used not only with the aforementioned conventional objects, but also as a mother mold for transferring the roughened surface state of the protective film (C) to the surface of the resin layer (B) for an optical waveguide. Where the surface of the resin layer (B) for an optical waveguide on the side from which the protective film (C) is peeled off is in a roughened state, the contact surface area of the resin layer (B) for an optical waveguide in contact with the planar body (D) is decreased and a large number of paths for releasing the air during bonding is ensured. Therefore, the presence of residual voids (fine air bubbles) in the resin layer (B) for an optical waveguide after the bonding can be minimized.

Examples of materials for the protective film (C) may be the same as those of the carrier base material (A).

In the present embodiment the surface of the protective film (C) which is to be in contact with the resin layer (B) for an optical waveguide is in a roughened state. The roughening can be performed by the publicly known methods, such as methods for post-processing the film, such as sandblasting, discharge processing which is also called physical etching processing, and chemical etching processing, a method by which a filler is added to a raw material to form protrusions and depressions on the surface, a method by which a filler-containing coating material is coated on the surface and cured, and a method for producing depressions and protrusions in the film itself, for example, by controlling the crystal structure ratio of the resin in the raw material and generating surface protrusions and depressions in the stretching process. The surface of the protective film (C) which is not in contact with the resin layer (B) for an optical waveguide may be smooth or roughened.

The roughened surface, as referred to in the present embodiment, is a surface having a roughness in excess of the level at which the surface of the protective film (C) that is in contact with the resin layer (B) for an optical waveguide is generally assumed to be flat (in other words, SRa is equal to or less than 0.07 μm and SRz is equal to or less than 1 μm). It is undesirable that the value of the roughness of the surface of the protective film (C) which is in contact with the resin layer (B) for an optical waveguide be equal to or less than the smoothness level, because when the surface of the resin layer (B) for an optical waveguide from which the protective film is peeled off is laminated on the below-described planar body (D), a portion where the air escape paths are eliminated increases in size and a large number of voids remains between the resin layer (B) for an optical waveguide and the planar body (D) after the bonding. It goes without saying that SRz is preferably equal to or less than the thickness of the resin layer (B) for an optical waveguide.

It is particularly preferred that SRa of the roughened surface be 0.1 μm to 1 μm and the SRz thereof be 1 μm to 10 μm. Where SRa is equal to or less than 0.1 μm or SRz is equal to or less than 1 μm, the number of air escape paths effective when the surface of the resin layer (B) appearing after the protective film (C) is removed is laminated on the planar body (D) is decreased and voids can easily remain in the resin layer (D) after the bonding. Where SRa is equal to or greater than 1 μm or SRz is equal to or greater than 10 μm, the resin layer (B) tends to remain locally on the protective film (C) side when the protective film (C) is peeled off, that is, the defects such as the separation from the carrier base material (A) tend to occur easily. Where the thickness of the resin layer (B) for an optical waveguide is equal to or less than 10 μm, as mentioned hereinabove, it is preferred than SRz be equal to or less than this thickness.

The peeling ability of the protective film (C) and the resin layer (B) for an optical waveguide in the present embodiment is apparently greatly affected by the anchor effect produced by the roughened surface of the protective film (C), but it is also apparently affected by physical interaction of the resin layer (B) and the protective film (C). Wettability is a specific example of physical interaction. As a result, depending on the type of the protective film, the peeling ability from the resin can be degraded even when the SRa is 1 μm. Therefore, it is particularly preferred that the SRa be 0.1 μm to less than 0.5 μm and the SRz be 1 μm to less than 5 μm. An even more preferred range for the SRa is 0.1 μm to 0.3 μm.

The advantage of the SRa and the SRa being within such ranges is that the residual voids in the resin layer (B) after the bonding can be minimized and the product can be used without problems regardless of the thickness of the resin layer (B).

The roughened surface of the protective film (C) on the side that is in contact with the resin layer (B) for an optical waveguide may be additionally subjected to parting treatment. For example, a thin film of a silicon compound or a fluororesin with a low surface energy can be formed by using a typical method such as coating and drying, vapor deposition, and sputtering. The surface of the protective film (C) on the side that is not in contact with the resin layer (B) for an optical waveguide may be also subjected to the same parting treatment.

Further, as mentioned hereinabove, in order to ensure peeling at the interface of the resin layer (B) for an optical waveguide and the protective film (C) when the protective film (C) is peeled off from the resin layer (B) for an optical waveguide, the adhesion at the interface of the protective film (C) and the resin layer (B) for an optical waveguide is made less than the adhesion at the interface of the carrier base material (A) and the resin layer (B) for an optical waveguide.

The thickness of the protective film (C) is not particularly limited and may be determined with consideration for handleability and cost. It is undesirable that the protective film be too thin because it results in insufficient strength, defects such as pinholes, and a high cost. Where the protective film is too thick, the rigidity of the entire dry film becomes too high and the film is difficult to handle. Other drawbacks include the increased thickness and weight and also increased transportation cost. Therefore, it is generally preferred that the thickness be 10 µm to 100 µm.

Further, as necessary, an antistatic agent or a substance having active energy ray absorption capacity may be mixed to, dispersed in, or coated on the protective film (C), within a range in which the effect of the present invention is not degraded. Where the resin layer (B) for an optical waveguide is a photosensitive resin, it is particularly preferred that a substance which is capable of cutting a wavelength at which the resin layer (B) for an optical waveguide can be cured, for example, a UV absorber or a substance absorbing the light with a wavelength equal to or less than a short wavelength of visible light (specific dyes and pigments, inorganic powders such as cerium oxide, and the like), be present inside the protective film (C) or on the surface thereof because such a substance can prevent the unnecessary exposure to active energy rays from the protective film (C) side within a period of time from immediately after the dry film is produced till the resin layer (B) for an optical waveguide is exposed.

In the present embodiment, since the protective film (C) is brought into direct contact and bonded to the resin layer (B) for an optical waveguide, the resin layer (B) for an optical waveguide itself acts as an adhesive layer. In such a case, the surface of the resin layer (B) for an optical waveguide obtained by peeling off the protective film (C) from the laminated dry film reflects the surface of the protective film (C). The surface state of the resin layer (B) for an optical waveguide that reflects the surface of the protective film (C), as referred to herein, means a state in which the roughness value constituting 40% to 100% of the value of the roughness (SRa, SRz) of the surface of the protective film (C), which is in contact with the resin layer (B) for an optical waveguide, is maintained. Where the surface of the resin layer (B) for an optical waveguide is roughened at such a level, it is possible to minimize, as mentioned hereinabove, the residual voids in the resin layer (B) for an optical waveguide after the bonding.

A typical method can be used for laminating the protective film (C) and the resin layer (B) for an optical waveguide. Examples of suitable methods include a method by which the roughened surface of the protective film (C) is pressed with a roll at an adequate temperature against the surface of the resin layer (B) for an optical waveguide which is formed on the carrier base material (A), a method for pressing with a flat vacuum laminator, and a method for pressing by tension during winding in a roll-like shape.

The adequate temperature, as referred to herein, may be a lower temperature region in a temperature range in which the softening state can be realized in which the resin layer (B) for an optical waveguide can trace the roughened surface of the protective film (C). Although this temperature differs depending on the resin composition of the resin layer (B) for an optical waveguide, the suitable range is typically from room temperature to 100° C., but this range is not limiting. It is undesirable that this temperature be higher by about 70° C. or more than the lowest temperature in the temperature range in which the softening state can be realized such that the roughened surface can be traced. This is because at such a temperature, the resin of the resin layer (B) for an optical waveguide flows out from the end portion of the film, and the thickness of the resin layer (B) for an optical waveguide becomes less than the desired value (the layer becomes thin).

(Second Embodiment)

A method for manufacturing an optical waveguide according to another embodiment of the present invention is a method for manufacturing an optical waveguide using the above-described dry film for an optical waveguide, this method including the following steps which are performed in the order of description:

a step for preparing a planar body (D);

a step for peeling off the protective film (C) of the above-described dry film for an optical waveguide;

a step for bringing the resin layer (B) for an optical waveguide into contact with the planar body (D) and bonding by heating and pressurizing under vacuum while maintaining the roughness of the surface of the resin layer (B) for an optical waveguide from which the protective film (C) of the dry film for an optical waveguide is peeled off; and a step for curing the entire surface of the resin layer (B) for an optical waveguide or part thereof with active energy rays or heat.

[Step for Preparing the Flat Body (D)]

The flat body (D), as referred to in the present embodiment, is an object for bonding the resin film (B) for an optical waveguide of the dry film in accordance with the present invention.

Specific examples of the flat body include a substrate for electric wiring (a flexible substrate or a rigid substrate for an electric circuit), a bendable film-shaped material, a metal foil, or such substrate for electric wiring, bendable film-shaped material, and metal foil on which constituent members of an optical waveguide are formed. The planar body (D) may be also a temporary substrate that can be peeled off from an optical waveguide layer after the entire optical waveguide or part thereof is formed, or the temporary substrate on which the constituent members of the optical waveguide are formed.

Where the planar body (D) is a bendable film-shaped material, it may be a bendable film-shaped material that does not include an electric wiring, or on which the electric wiring is eventually not formed.

Various types of the aforementioned planar bodies (D) can be considered, but the effect of the present invention is apparently demonstrated to a greater extent in particular when the surface roughness of the planar body (D) is small, that is, when the surface roughness SRa of the planar body (D) which is the object for bonding the resin layer (B) for an optical waveguide is equal to or less than 0.1 µm because a large number of air bubbles can easily remain in the resin layer (B) for an optical waveguide after the bonding.

The planar body (D) such as described hereinabove can be obtained by a well-known manufacturing method. In particular, a body in which a lower cladding is formed thereon, a body in which a lower cladding and a core are formed thereon, or a body in which a lower cladding, a core, and an upper cladding are formed thereon can be obtained by using the dry film for an optical waveguide and the manufacturing method thereof which are disclosed in the present embodiment.

[Step for Peeling Off the Protective Film (C) of the Dry Film for an Optical Waveguide]

Figure 2:
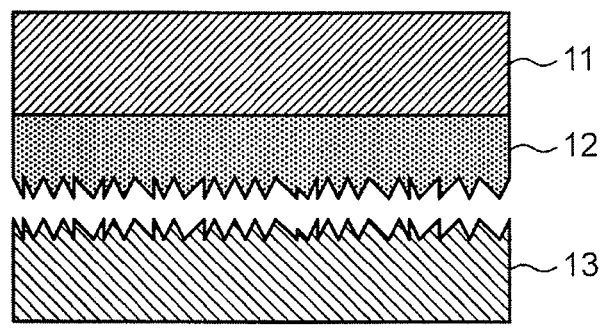
FIG. 2 is a cross-sectional schematic diagram illustrating a state after a protective film of the dry film for a lower cladding is peeled off in the method for manufacturing an optical waveguide using the dry film for an optical waveguide according to the embodiment of the present invention.

In the dry film for an optical waveguide of the present embodiment, the protective film (C) is laminated on the resin layer (B) for an optical waveguide. Therefore, the protective film (C) initially is peeled off in order to bond the resin layer (B) for an optical waveguide and the planar body (D) to each other. The peeling method is not particularly limited, and the protective film (C) may be peeled off manually or with a mechanical device from one side or a corner of the dry film for an optical waveguide. FIG. 2 is a schematic diagram illustrating the state after the protective film (C) of the dry film for a lower cladding of the dry film for an optical waveguide is peeled off.

[Step for Bringing the Resin Layer (B) for an Optical Waveguide and the Planar Body (D) into Contact with Each Other and Bonding them Together by Heating and Pressurizing Under Vacuum while Maintaining the Surface Roughness of the Resin Layer (B) for an Optical Waveguide from which the Protective Film (C) of the Dry Film for an Optical Waveguide is Removed]

Figure 3:
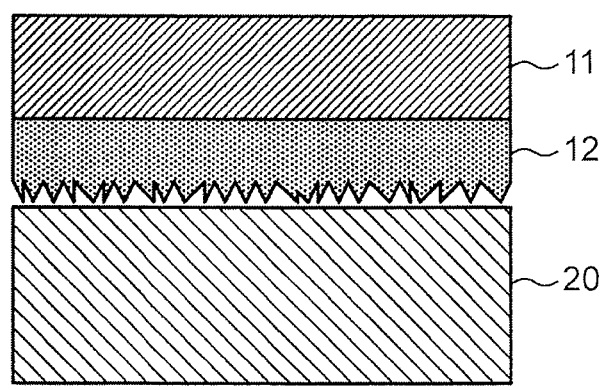
FIG. 3 is a cross-sectional schematic diagram illustrating a state after a resin layer surface and a planar body are brought close to each other without reducing the roughness of the surface of the resin layer for an optical waveguide from which the protective film of the lower cladding dry film of an optical waveguide is peeled off in the manufacturing method of the present embodiment.

In the present embodiment, the roughness of the surface of the resin layer (B) for an optical waveguide which has appeared after the protective film (C) is peeled off is maintained and the surface is prevented from flattening in order to bring the roughened surface of the resin layer (B) for an optical waveguide into contact with the planar body (D). For example, it is necessary to avoid the state in which the roughened surface state of the resin layer (B) is flattened by pressure application as a result of pinching the surface of the resin layer (B) for an optical waveguide, which is obtained after the protective film (C) is peeled off, with rolls when the layer passes through any device, or because any body is laminated on the dry film from which the protective film (C) is peeled off. The roughened state should be also prevented from being flattened by softening or melting of the surface of the resin layer (B), from which the protective film (C) is peeled off, due to exposure to a high temperature. By eliminating such factors which reduce surface roughness, it is possible, as mentioned hereinabove, to maintain the values of roughness which are about 40% to 100% of the values of surface roughness (SRa, SRz) of the protective film (C) which is in contact with the resin layer (B) for an optical waveguide as the surface state of the resin layer (B) for an optical waveguide which appears after the protective film (C) having such surface roughness is peeled off. FIG. 3 is a schematic diagram illustrating the state in which, by way of example, a dry film for a lower cladding is in contact with the planar body (D) while surface roughness of the resin layer (B) is maintained in the present embodiment.

The surface of the resin layer (B) for an optical waveguide appearing after the protective film (C) is peeled off is brought into contact with the planar body (D) so that the resin layer (B) for an optical waveguide could be eventually bonded to and laminated on the planar body (D). The bonding step can be generally classified into two methods. With the first method, the dry film is cut to a size approximating that of the planar body (D), and the surface of the resin layer (B) for an optical waveguide which appears because the protective film (C) is peeled off is placed on the planar body (D). The other method is a roll lamination method which is also referred to as pre-bonding. With this method the dry film for an optical waveguide which is wound in a roll shape is brought into contact by using a roll with the planar body (D), while the protective film (C) is being peeled off, and pre-bonded to the planar body under an adequate linear pressure.

When the resin layer (B) for an optical waveguide is abutted against (brought into contact with) the planar body (D), it is necessary that the surface of the resin layer (B) for an optical waveguide have tackiness at the present temperature. The temperature in the former case is the room temperature and typically is 20° C. to 30° C. Where the surface of the resin layer (B) lacks tackiness in this temperature range, the dry film easily separates in the process of handling the dry film after placing on the planar body (D), the dry film is fixed to a location at a distance from the desired position of the planar body (D) in the bonding step which is thereafter performed, and a defective product is obtained. In the latter case, the temperature is the temperature of rolls and typically is within a range from room temperature to about 100° C. In this case, the resin layer (B) also should be tacky at the temperature of contact, and where the resin layer lacks tackiness, the pre-bonding is impossible.

The configuration in which the planar body (D) and the surface of the resin layer (B) for an optical waveguide are eventually brought into contact with each other or abutted against each other, without reducing the surface roughness of the resin layer (B) for an optical waveguide, which appeared because the protective film (C) is peeled off, is subjected to vacuum lamination. The vacuum lamination, as referred to herein, is a bonding method using a device that has a function of placing a work on a plate heated to a necessary temperature, evacuating, and applying a pressure in the vertical direction at a necessary temperature to the work, while maintaining the vacuum.

A large number of commercial devices suitable for laminating materials of a dry film type, starting with the so-called build-up films, for manufacturing laminated sheets by a build-up method have been marketed. Specific examples include the devices marketed by Meiki Co., Ltd., Nichigo-Morton Co., Ltd., San Ei Giken Inc., and Kitagawa Seiki Co., Ltd. A vacuum flat-plate press and a vacuum multistage press, which is a widely used in manufacturing laminated sheets by using prepregs, can be also used.

Where such devices are used and the lamination conditions are adequately set, it is possible to realize a state in which the presence of voids in the resin layer (B) for an optical waveguide after completion of the lamination is minimized. Examples of conditions used with the device V130 manufactured by Nichigo-Morton Co., Ltd. include setting the temperature of the upper and lower elastic bodies to 50° C. to 110° C., evacuating the space into which the work is placed, holding for 10 sec to 90 sec after the gas pressure has reached 100 Pa (Pascal), introducing compressed air under a pressure of 0.2 MPa to 1 MPa into the upper elastic body to apply stresses in the vertical direction of the work, holding the state obtained from 30 sec to 120 sec, and then releasing the pressure, and removing the work.

Where the bonding conditions are inadequate, for example, when the temperature is 35° C., the holding time after a pressure of 100 Pa reached is 2 sec, the pressure of the compressed air is 0.15 MPa, or the holding time in a state under applied pressure is 10 sec, voids can easily remain in the resin layer (B) after the bonding.

Figure 4:
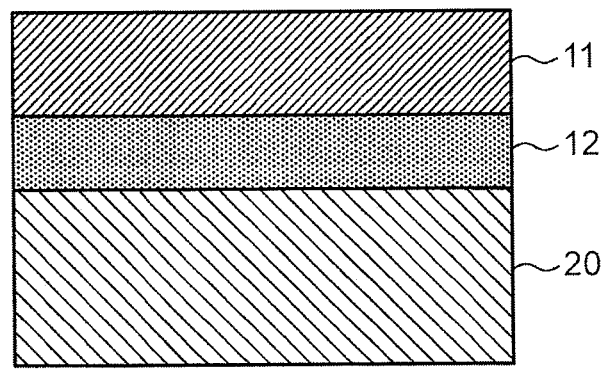
FIG. 4 is a cross-sectional schematic diagram illustrating a state after the resin layer for an optical waveguide and the planar body are bonded together by heating and pressurizing under vacuum in the manufacturing method of the present embodiment.

FIG. 4 is a schematic diagram illustrating the state after the bonding step is completed, the dry film for a lower cladding being considered by way of example.

Where a rubber elastic body is used for a portion that pressurizes the work in a vacuum laminator, when a difference in height equal to or greater than about 10 µm is present on the surface of the circuit pattern, or the like, formed on the surface of the planar body (D), a difference in height reflecting the aforementioned difference in height, although being of a smaller value, can appear on the surface of the resin layer (B) for an optical waveguide after the bonding. Where such a difference in height causes problems in the subsequent steps or in the final product, the so-called flattening step may be performed after the bonding step. In the flattening step, a hard flat plate of stainless steel or the like is typically placed on top (dry film side) of the works subjected to the bonding, and the work surface is forcibly flattened by vacuum lamination under heating, or the surface of the work is forcibly flattened with a flat-plate press under heating.

[Step for Curing the Entire Surface of the Resin Layer (B) for an Optical Waveguide, or Part Thereof, with Active Energy Rays or Heat]

Which means, from among the active energy beam and heat, can be used for curing is determined by whether the composition of the resin layer (B) for an optical waveguide is curable by the active energy rays, by heat, or by both the active energy rays and the heat.

With a composition that can be cured at least by the active energy rays, where a device is used which enables in-plane irradiation with the active energy rays, the surface can be cured by one-step irradiation of the entire surface of the resin layer (B) for an optical waveguide, and partial curing can be performed by irradiating only the necessary portion with the active energy rays through a photomask (can be also referred to simply as "mask"). Where a device is used in which irradiation with active energy rays is performed in the form of a beam, the entire surface of the resin layer (B) for an optical waveguide can be cured by scanning (sweeping) the entire surface, and partial curing can be performed by using, as necessary, a mask corresponding to the diameter of the beam of the active energy rays and irradiating the necessary portion by scanning the active energy rays through the mask. In his case, after curing with the active energy frays, curing can be further advanced by heating (can be referred to as after-curing, after-baking, or simply bake or baking).

Meanwhile, where the composition can be cured at least with heat, the entire surface can be cured by placing the work including the resin layer (B) for an optical waveguide into an environment at a temperature necessary for curing. Alternatively, partial curing of the resin layer (B) for an optical waveguide can be performed by local irradiation through a mask with laser radiation such as that of a carbon dioxide laser, or the like, which generates thermal radiation or electromagnetic waves with a wavelength corresponding to thermal radiation, or by scanning and irradiating the necessary portion with the beam through a mask, as necessary, according to the diameter thereof.

Incidentally, the carrier base material (A) may be peeled off before the resin layer (B) for an optical waveguide is cured partially or over the entire surface, or after the curing.

Figure 5:
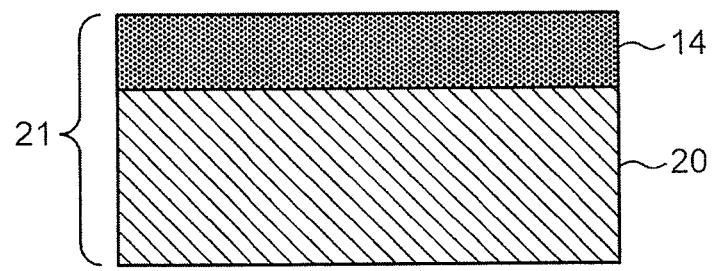
FIG. 5 is a cross-sectional schematic diagram illustrating a state obtained by curing the resin layer for an optical waveguide and then removing the carrier base material in the manufacturing method of the present embodiment.

FIG. 5 is a schematic diagram illustrating the state after the curing step is completed, the dry film for a lower cladding being considered by way of example.

It is preferred that the resin layer (B) for an optical waveguide be heated under conditions such that the resin layer (B) for an optical waveguide is softened or melted, while not reaching the curing stage, before the above-described curing step is performed. The object of such heating is to reduce the loss in the optical waveguide. There are two manifestation mechanisms thereof which are explained hereinbelow.

The first mechanism is the flattening (smoothing) of the surface of the resin layer (B) for an optical waveguide. Under the effect of fine particles or dust present on the outer surface of the carrier base material during the bonding, fine depressions appear on the surface of the carrier material, on the dry film side thereof, after the bonding (lamination) step is completed, and those depressions reach the surface of the resin layer (B) for an optical waveguide, whereby fine depressions are formed on the surface of the resin layer (B) for an optical waveguide. The resin layer (B) for an optical waveguide is easily deformed by heating, and where heating is performed while the carrier base material (A) is still attached, the depressions are repaired and flattened by the elasticity of the carrier base material (A). Where the resin layer (B) for an optical waveguide is for the lower cladding on which the core is to be formed, or where the resin layer is for the upper cladding, but a core is further formed thereon, as in the case in which a multilayer optical waveguide is formed, when depressions are present on the cladding surface, depressions also appear on the outer surface of the optical waveguide core. Further, in the case of the core, where depressions are present on the surface of the resin layer, depressions also appear on the core surface, thereby generating protrusions and depressions on the core surface and increasing the waveguide loss. Therefore, such as result can be effectively prevented by flattening the surface.

The second mechanism is the reduction of the effect produced by the core side surface on the wave propagating in a ridge optical waveguide. Where the dry film for an optical waveguide is for an upper cladding that encloses the core of a ridge optical waveguide, when the upper cladding is laminated on the core of the ridge optical waveguide and the upper cladding resin is heated without curing, the cladding material diffuses and permeates into the core side surface and a layer having a refractive index between that of the core and that of the cladding appears on the core side surface. Therefore, the amount of guide light that passes through this portion decreases. As a result, the waveguide loss degradation caused by the roughness of the core side surface can be suppressed and a low-loss optical waveguide can be realized.

The temperature of heating for realizing the two manifestation mechanisms with the objective of loss reduction depends on the softening characteristic or melting characteristic of the resin layer used, but generally it is preferred that this temperature be 80° C. to 160° C., more preferably 100° C. to 140° C. Further, the heating time is equal to or longer than the time needed to attain the objective, and from the standpoint of increasing the throughput of the step, it is preferred that this time be 10 min to 60 min, more preferably 10 min to 30 min.

Further, it is preferred that the so-called development step be performed after the step for partially curing the resin layer (B) for an optical waveguide. Patterning is typically the objective of partial curing. Any means can be used in the development step, provided that the non-cured portions of the resin layer (B) for an optical waveguide can be removed. Development with organic solvents, aqueous alkaline solutions, and aqueous acidic solutions of various types, or the development using the means disclosed in Japanese Unexamined Patent Publication No. 2007-292964 can be used according to the properties of the resin layer (B) for an optical waveguide.

Incidentally, the objective of patterning is to form locally the cladding on the planar body, or to form the core of a ridge optical waveguide, or to form, simultaneously with the core of the ridge optical waveguide, an alignment mark or a structure having a light via function or a structure for suppressing crosstalk between the cores, or to provide an opening such as a via hole for electric connection or as an alignment mark in the cladding.

In the method for manufacturing an optical waveguide of the present embodiment, the core is formed after the lower cladding layer is formed, and then the upper cladding can be formed. The core and claddings can be formed by repeating the above-described steps.

Figure 6:
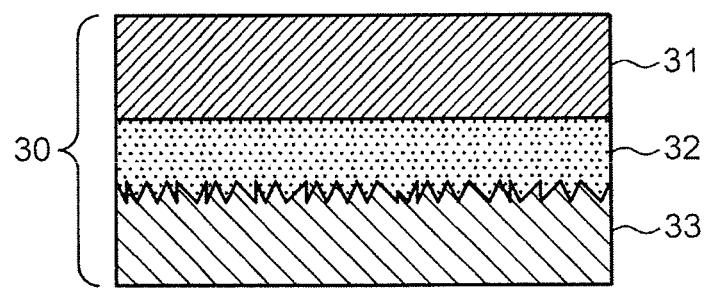
FIG. 6 is a cross-sectional schematic diagram illustrating the configuration of a dry film for a core which is a dry film for an optical waveguide in another embodiment of the present invention.
Figure 7:
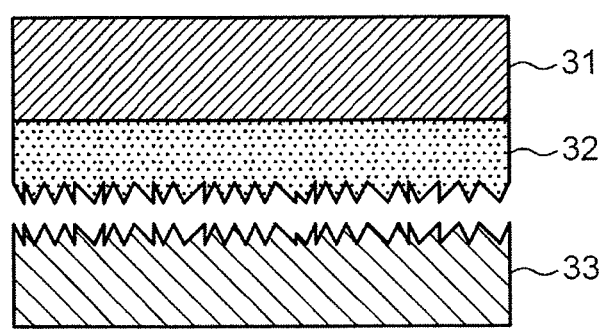
FIG. 7 is a cross-sectional schematic diagram illustrating a state after the protective film of the dry film for a core is peeled off in the manufacturing method according to another embodiment of the present invention.
Figure 8:
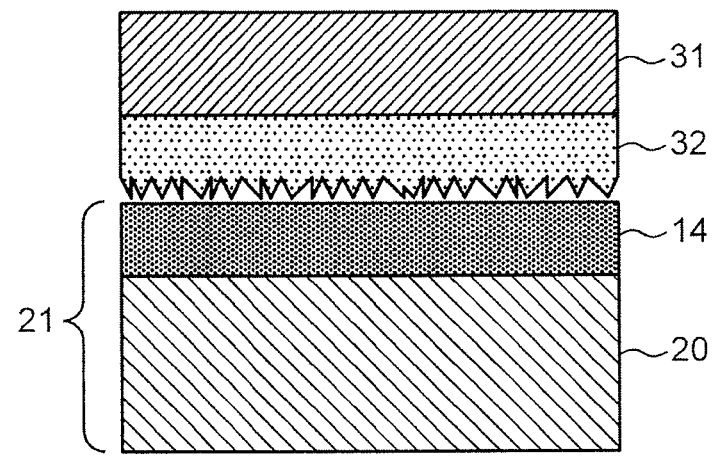
FIG. 8 is a cross-sectional schematic diagram illustrating a state after a resin surface and a lower cladding layer formed on a planar body are brought close to each other without reducing the roughness of the surface of the resin layer for an optical waveguide from which the protective film of the dry film for a core for an optical waveguide is peeled off in the manufacturing method according to another embodiment of the present invention.
Figure 9:
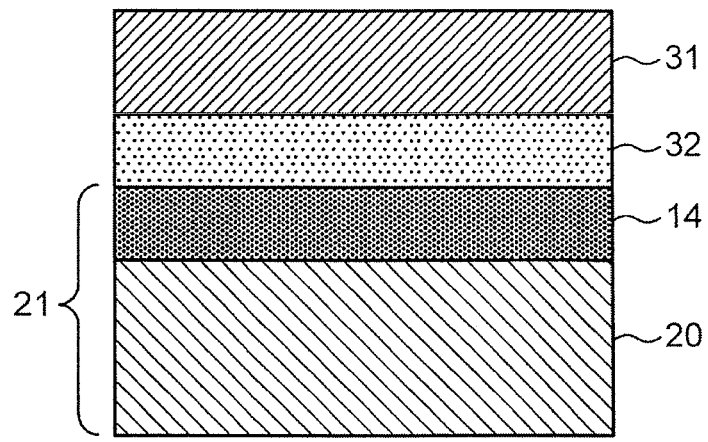
FIG. 9 is a cross-sectional schematic diagram illustrating a state after the resin layer for a core of an optical waveguide and the lower cladding layer are bonded together by heating and pressurizing under vacuum in the manufacturing method according to another embodiment of the present invention.
Figure 10:
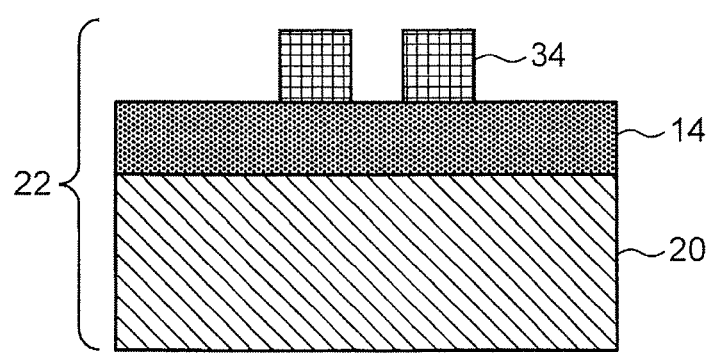
FIG. 10 is a cross-sectional schematic diagram illustrating the configuration in which the lower cladding layer and the core layer are formed on a planar body, the configuration being obtained by a method including a step for locally curing a resin layer (for a core) for an optical waveguide, a step for peeling off the carrier base material, and a development step for removing the uncured portion in the manufacturing method according to another embodiment of the present invention.

A core 34, as depicted in FIG. 10, is formed by using the dry film 30 for core formation which is depicted in FIG. 6, peeling off the protective film 33 as depicted in FIG. 7, bringing the film into contact with the lower cladding 14 formed on the planar body, as depicted in FIG. 8, bonding under heating and pressurization in vacuum to obtain the bonded body depicted in FIG. 9, and then partially curing and developing in the case of a ridge optical waveguide. In the case of a slab optical waveguide, the resin layer for the core in the bonded body depicted in FIG. 9 is cured over the entire surface, or locally in-plane patterned, as necessary, and cured to form the core (not shown in the figure).

Figure 11:
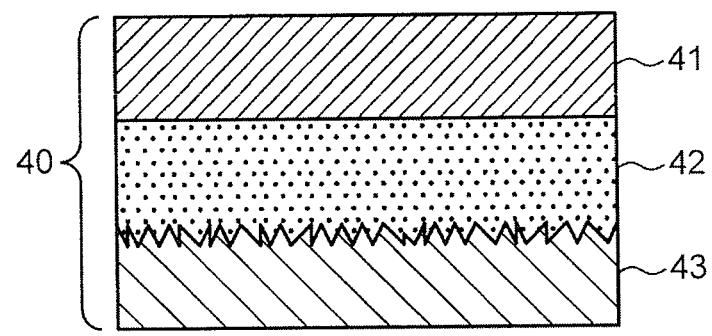
FIG. 11 is a cross-sectional schematic diagram illustrating the configuration of a dry film for an upper cladding which is a dry film for an optical waveguide according to yet another embodiment of the present invention.
Figure 12:
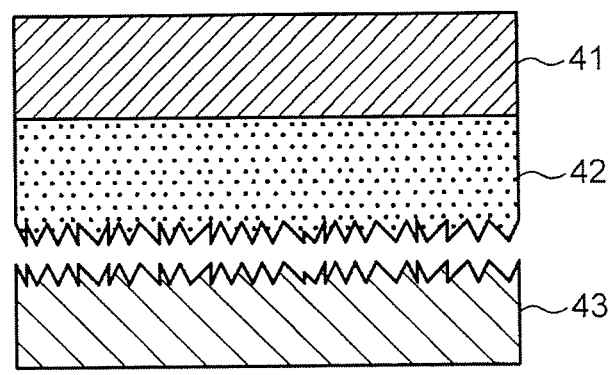
FIG. 12 is a cross-sectional schematic diagram illustrating a state after the protective film of the dry film for an upper cladding is peeled off in the manufacturing method according to yet another embodiment of the present invention.
Figure 13:
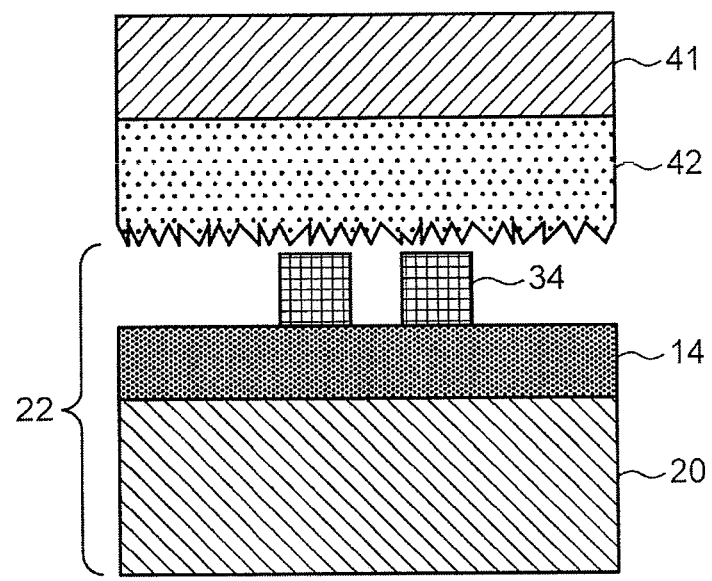
FIG. 13 is a cross-sectional schematic diagram illustrating a state after a core layer and a lower cladding layer formed on a planar body are brought close to a resin layer surface, without reducing the roughness of the surface of the resin layer for an optical waveguide from which the protective film of the dry film for an upper cladding of an optical waveguide is peeled off in the manufacturing method according to another embodiment of the present invention.
Figure 14:
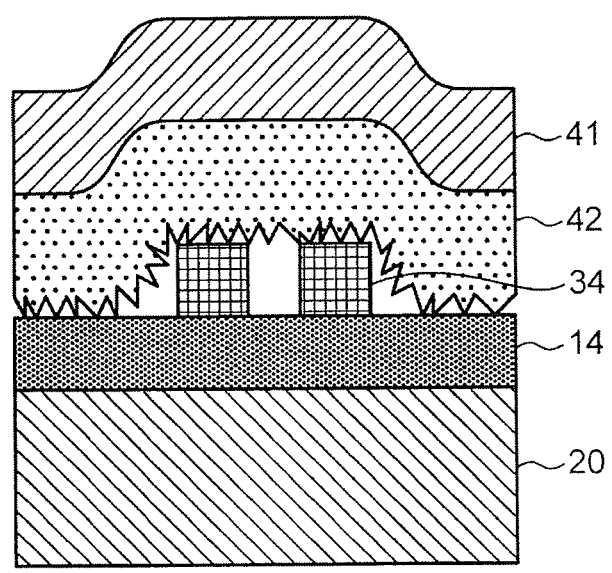
FIG. 14 is a cross-sectional schematic diagram illustrating a state after the resin layer for an upper cladding, the core layer, and the lower cladding layer of an optical waveguide are brought close to each other in the manufacturing method according to another embodiment of the present invention.
Figure 15:
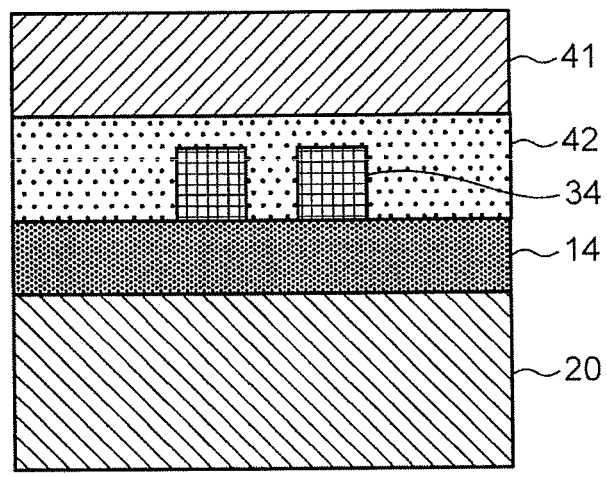
FIG. 15 is a cross-sectional schematic diagram illustrating a state after the resin layer for an upper cladding, the core layer, and the lower cladding layer of an optical waveguide are bonded together by heating and pressurizing under vacuum in the manufacturing method according to another embodiment of the present invention.
Figure 16:
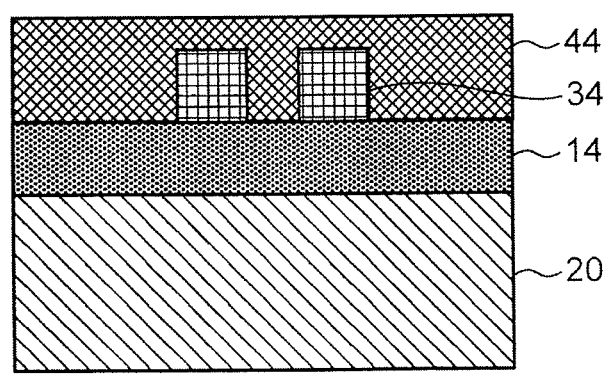
FIG. 16 is a cross-sectional schematic diagram illustrating a state after the lower cladding layer, core layer, and upper cladding layer are formed on a planar body in the manufacturing method according to another embodiment of the present invention.

Further, the upper cladding 44 is formed by using the dry film 40 for forming an upper cladding, which is depicted in FIG. 11, peeling off the protective film 43, as depicted in FIG. 12, bringing close to the core 34 and the lower cladding 14 formed on the planar body, as depicted in FIG. 13, and then bringing into contact, as depicted in FIG. 14, bonding under heating and pressurization in vacuum to obtain the bonded body depicted in FIG. 15, and then curing the resin layer for the upper cladding. FIG. 16 depicts a cross-sectional configuration example of an optical waveguide in which the carrier base material 41 of the dry film for an upper cladding is eventually peeled off and removed.

When optical waveguide cores are laminated in multiple layers (plurality of layers or multipole stages), a lower cladding, and then a core, and an upper cladding may be formed thereon, as necessary, by the same method.

[Third Embodiment]

The present invention is inclusive of an optical waveguide obtained by the manufacturing method such as described hereinabove, or a substrate or a member having an information transmission function and including the optical waveguide.

Where the planar body (D) is a substrate for electric wiring or a substrate for electric wiring on which optical waveguide constituent members are formed, it is possible, as described hereinabove, to manufacture an optical-electrical composite substrate with a low optical waveguide loss and minimized production spread and defect ratio.

Further, where the planar body (D) is a bendable film material which does not include electric wiring or on which the electric wiring is eventually not formed, or such film material on which optical waveguide constituent members are formed, it is possible, as described hereinabove, to manufacture a flexible optical waveguide with a low optical waveguide loss and minimized production spread and defect ratio.

As a result, it is possible to realize a flexible optical waveguide sheet having a core pitch at a level unattainable with an optical fiber array, signal transmission between the boards that require ultrahigh-speed information transmission can be realized without the convergence of transmission elements (fibers or optical waveguide sheets), and the increased efficiency of ventilation for cooling inside the device can eventually result in energy savings. Incidentally, the outer cladding diameter in a typical optical fiber is presently 250 µm and the core pitch is also 250 µm at a minimum. Even with a finer optical fibers, the outer cladding diameter is 125 µm and the minimum core pitch in this case is 125 µm. Meanwhile, in an optical waveguide using the dry film for an optical waveguide, a core pitch of 62.5 µm can be easily obtained. Therefore, the space taken by the transmission elements can be easily reduced. This is because where a dry film with the thickness of the optical waveguide resin layer for a core of 30 µm is used, patterning can be easily performed to a core cross section of 30 µm (square) and a core spacing of 32.5 µm, and where a dry film with the thickness of the optical waveguide resin layer for a core of 35 µm is used, patterning can be easily performed to a core cross section of 35 µm (square) and a core spacing of 27.5 µm. By forming a core in multiple layers (multiple stages), it is possible to obtain a light transmitting element having cores with even higher density.

Further, where the planar body (D) is a metal foil or a metal foil on which optical waveguide constituent members are formed, an optical-electrical composite substrate can be formed by forming an optical waveguide or a first cladding and a core on the metal foil, then aligning, laminating, and bonding the opposite surface of the metal foil to an electric surface substrate, forming a metal circuit on the metal foil on the surface by the well-known method, and forming, as necessary, via holes or through holes.

As a specific example, a resin composition varnish for a cladding is coated on a copper foil or the aforementioned peelable copper foil and dried, or a dry film material for a cladding is vacuum laminated, and then curing is performed to form a first cladding layer. Then, a dry film material for a core is vacuum laminated and patterned to form an optical waveguide core, and a region is processed to have a deflection function, such as a mirror or a diffraction grating, at the desired position of the core pattern, such that the light passing through the core is deflected, as necessary, to the copper foil side or opposite copper foil side. The product is then integrated with a separately fabricated electric circuit substrate. Two methods can be used therefor.

With the first method, the copper foil on which the first cladding and the core pattern (the core on which a deflection region is formed, as necessary) are formed and the electrical circuit substrate are vacuum laminated, with a thermally curable dry film material layer for a cladding being interposed therebetween, and then bonded together by heating and curing. In this case, it is preferred that the thermally curable dry film material layer for a cladding be vacuum laminated on the core pattern side of the copper foil on which the first cladding and the core pattern are formed, the carrier base material (A) be peeled off without curing, and the optical waveguide resin layer (B) for a cladding, which appeared because the carrier base material (A) is peeled off, be brought into contact with the electric circuit substrate and vacuum laminated. It is also preferred that the protective film (C) in accordance with the present invention be vacuum laminated, as necessary, on the surface of the optical waveguide resin layer (B) for a cladding, which appeared because the carrier base material (A) is peeled off, the protective film (C) be thereafter peeled off, the surface of the resin layer (B) for a cladding be roughened, and then brought into contact with the electric circuit substrate and vacuum laminated. In this case, the number of air bubbles remaining in the portion which becomes the second cladding after the vacuum lamination is minimized.

With the second method, a dry film for a second cladding is vacuum laminated on the core side of a core foil, on which a first cladding and a core (a core on which a deflection region is formed, as necessary) pattern are formed, the dry film is cured by the above-described method to complete an optical waveguide layer, and an electric circuit substrate and the optical waveguide side of a copper foil equipped with the completed optical waveguide layer are bonded together, with a member such as a thermally curable prepreg or a bonding sheet having a bonding function being interposed therebetween. Where the copper foil of the outermost layer is a peelable copper foil, an optical-electrical composite substrate can be obtained by peeling off and removing the carrier copper foil, finally forming a circuit by a publicly known method from the copper foil serving as an electric circuit, and forming, as necessary, via holes or through holes by a well-known method.

According to the present embodiment, it is possible to use a metal foil that is subjected to roughening or chemical surface treatment to improve adhesion to the resin. Therefore, the adhesion between the clad resin layer and the conductor circuit derived from the metal foil of the outermost layer can be improved and mounting reliability of the optical-electrical composite substrate can be greatly increased.

Where the planar body (D) is a temporary substrate such that peeling is possible between an optical waveguide layer and the planar body after the entire optical waveguide layer or part thereof is formed, or such a temporary substrate on which optical waveguide constituent members are formed, a thermoplastic resin sheet which has not been subjected to easy adhesion treatment and which can be peeled off at a stage at which the peeling is needed, without peeling off at a stage at which the optical waveguide is formed thereon, is advantageous as the temporary substrate. Suitable examples include sheets of polycarbonates (PC), acryls, and cycloolefin polymers. Where an optical waveguide layer is formed on such a temporary substrate, no chemical bonding occurs. Therefore, the optical waveguide layer can be peeled off without damage, by applying peeling stresses to the interface of the optical waveguide layer and the temporary substrate since no chemical bonding occurs.

With the present embodiment, it is possible to manufacture easily a film-shaped optical waveguide with a low loss and a small loss spread.

The configuration obtained by forming the entire optical waveguide or part thereof on an electric substrate can be transferred. In particular, when an optical path is formed such that the light is deflected to the temporary substrate side, which is mentioned in the present embodiment, the optical path deflection portions, such as a mirror or a diffraction grating, provided at the optical waveguide core can deflect the light in the optical path in the surface direction on the optical waveguide layer side of the optical-electrical composite substrate obtained by the transfer. Therefore, such a configuration is advantageous for optical coupling to an optical element disposed on the side of the optical waveguide. In this case, it is possible to form a conductor circuit on the upper layer of the optical waveguide layer to obtain electrodes for optical elements, and mount the optical elements thereon. Alternatively it is also possible to mount optical elements on the electrodes on the surface of the electric substrate by using a planar body that forms the optical waveguide as an electric substrate and patterning in a manner such that the optical waveguide layer is not present on the surface electrodes.

For example, a lower cladding and a core are formed on a temporary substrate made from a UV-transmitting PC, a light-deflecting portion (mirror) is formed, as necessary on the core, a carrier base material is peeled off and removed in a state in which a dry film for the upper cladding is laminated, but the upper cladding layer is not cured, the surface of the resin for the upper cladding is arranged with respect to and vacuum laminated on an electric substrate that is fabricated in advance, UV exposure and/or heat treatment is performed from the PC side, and the PC plate is then peeled off and removed. Then, a copper layer is formed over the entire surface by bonding a copper foil provided with a thermosetting epoxy resin (also referred to as RCC) to the lower cladding layer which has appeared on the surface of the optical waveguide layer, or by bonding a copper foil through a prepreg or an adhesive sheet which is called a bonding sheet and includes an epoxy resin, or by chemically plating copper after performing priming treatment that increases adhesion of chemically plated coating. An optical-electrical composite substrate is then obtained by forming an electric circuit from copper by the usual method.

As another example, an optical-electrical composite substrate is obtained by forming a lower cladding, a core, a light deflection portion on the core, and an upper cladding on a temporary substrate from a UV-transmitting PC, bonding the upper cladding surface and an electric substrate by using a bonding sheet, a prepreg, or an adhesive, peeling off and removing the temporary substrate, and forming an electric circuit in the above-described manner on the lower cladding surface that has appeared on the surface. With such an embodiment, conduction confirmation of light in the optical circuit constituted by the optical waveguide and light deflecting portion can be performed from the temporary substrate side. Therefore, an optical waveguide which is confirmed to be a quality product can be integrated with the electric substrate. As a result, the yield of the optical—electrical composite substrates can be further increased.

As indicated hereinabove, the present description discloses a variety of features, and the main of those features are summarized hereinbelow.

A dry film for an optical waveguide of one aspect of the present invention has a carrier base material (A), a resin layer (B) for an optical waveguide that can be cured by active energy ray or heat, and a protective film (C), wherein a surface of the protective film (C) that is in contact with the resin layer (B) for an optical waveguide is a roughened surface.

With such a configuration, it is possible to provide a dry film for an optical waveguide that enables the manufacture of an optical waveguide in which the remaining fine air bubbles are minimized. Further, the waveguide loss of the optical waveguide can be reduced and the production yield and reliability can be increased. In addition, the steps for forming the cladding layer and the core layer can be implemented using the same apparatus, and the optical waveguide production cost can be reduced In the dry film for an optical waveguide, it is preferred that the carrier base material (A) be a resin film or a metal foil, the protective film (C) be a thermoplastic resin film, and the roughness of the roughened surface of the protective film (C) be 0.1 µm to 1 µm as an arithmetic average roughness (SRa) and 1 µm to 10 µm as a ten-point average roughness (SRz). As a result, an optical waveguide in which the remaining fine air bubbles are minimized can be manufactured more reliably.

In the dry film for an optical waveguide, it is also preferred that the resin layer (B) for an optical waveguide include a compound having an epoxy group, and a photo-curing initiator that can cause curing by inducing a reaction of the epoxy group of the compound by irradiation with active energy rays. With such a configuration, it is possible to realize an optical waveguide which has a very low loss and also excellent electric characteristics because of the epoxy resin which has been successfully used for many years as a material for multilayer electric substrates.

In the dry film for an optical waveguide, it is also preferred that the resin layer (B) for an optical waveguide include a compound having an ethylenic double bond and a photocuring initiator that can cause curing by inducing a reaction of the ethylenic double bond of the compound by irradiation with active energy rays. With such a configuration, it is possible to realize a low-loss optical waveguide that can be patterned by alkali development the same as used with a typical resist material.

Another aspect of the present invention relates to a method for manufacturing an optical waveguide in use of the dry film for an optical waveguide, the method comprising the following steps performed in order:

a step for preparing a planar body (D);

a step for peeling off the protective film (C) of the dry film for an optical waveguide;

a step for bringing the resin layer (B) for an optical waveguide and the planar body (D) into contact with each other while maintaining a roughness of the surface of the resin layer (B) for an optical waveguide from which the protective film (C) of the dry film for an optical waveguide is peeled off, and bonding the resin layer and the planar body together by heating and pressurizing under vacuum; and a step for curing the entire or a part of surface of the resin layer (B) for an optical waveguide with active energy rays or heat.

With such a configuration, it is possible to manufacture an optical waveguide in which the remaining fine air bubbles are minimized. Further, the waveguide loss of the optical waveguide can be reduced and the production yield and reliability can be increased. In addition, the steps for forming the cladding layer and the core layer can be implemented using the same apparatus, and the optical waveguide production cost can be reduced.

In the method for manufacturing an optical waveguide, it is preferred that the planar body (D) be a substrate for electric wiring or a substrate for electric wiring on which optical waveguide constituent members are formed. With such a configuration, an optical-electrical composite wiring substrate with a low optical waveguide loss and minimized production spread and defect ratio can be produced more reliably.

Alternatively, in the method for manufacturing an optical waveguide, it is preferred that the planar body (D) be a bendable film-shaped material which includes no electric wiring or in which no electric wiring is to be eventually formed, or a film-shaped material on which constituent members of an optical waveguide are formed. With such a configuration, a flexible optical waveguide with a low optical waveguide loss and minimized production spread and defect ratio can be produced more reliably.

Alternatively, in the method for manufacturing an optical waveguide, it is preferred that the planar body (D) be a metal foil or a metal foil on which constituent members of an optical waveguide are formed. With such a configuration, since a metal foil is used which has been subjected to roughening or chemical surface treatment to increase adhesion to a resin layer, adhesiveness between the cladding resin layer and the conductor substrate derived from the metal foil of the outermost surface layer can be increased, and mounting reliability of an optical-electrical composite substrate, or the like, can be greatly increased.

Alternatively, in the method for manufacturing an optical waveguide, it is preferred that the planar body (D) be a temporary substrate that can be peeled off from an optical waveguide layer after the entire optical waveguide or part thereof is formed, or the temporary substrate on which the constituent members of the optical waveguide are formed. With such a configuration, it is possible to manufacture easily a film-shaped optical waveguide with a low loss and a small loss spread.

Other aspects of the present invention include an optical waveguide manufactured by the above-described method, and a substrate or a member including the optical waveguide and having an information transmission function.

The present invention will be explained hereinbelow in greater detail on the basis of examples thereof, but the scope of the present invention is not limited to those examples.

EXAMPLES

[Manufacture of Resin Varnish for Optical Waveguide]

Varnishes of epoxy resins and acrylic resins were fabricated as resins for an optical waveguide. The fabricated epoxy resin varnishes were E-CL for a cladding and E-CO for a core as types curable with active energy rays (UV), and E-CL2 for a cladding as a type curable with heat. The varnishes were prepared by compounding as indicated in Table 1, mixing and dissolving all of the components at 60° C., and pressure filtering with a PTFE membrane filter with a pore size of 1 μm. The following starting materials were used.

EHPE3150: an epoxy resin which is 1,2-epoxy-4-(2-oxiranyl)cyclohexane of 2,2-bis(hydroxymethyl)-1-butanol manufactured by Daicel Chemical Industries Co., Ltd.

CELLOXIDE 2021P: an epoxy resin which is 3,4-epoxycyclohexenyl methyl-3',4'-epoxycyclohexane carboxylate manufactured by Daicel Chemical Industries Co., Ltd.

Epicoat 1006FS: a bisphenol A epoxy resin manufactured by Sanyo Chemical Co., Ltd.

Epiclon 850S: a bisphenol A epoxy resin manufactured by DIC, Inc.

VG3101L: a trifunctional epoxy resin having a bisphenol skeleton which is manufactured by Printec Corp. (CAS number: 110726-28-8).

EPPN201: a phenol-novolac epoxy resin manufactured by Nippon Kayaku Co., Ltd.

YP50: a bisphenol A epoxy resin with a number-average molecular weight of 60,000 to 80,000 manufactured by Nippon Steel and Sumitomo Metal Corp.

Epicoat YH300: a trimethylolpropane-type epoxy resin which is an epoxy resin of an aliphatic polyglycidyl ether type manufactured by Nippon Steel and Sumitomo Metal Corp.;

SP-170: a photo-acid-generating agent of the so-called sulfonium salt system which includes 4,4'-bis[di(β-hydroxyethoxy)phenylsulfonio]phenylsulfido-bis-hexafluoroantimonate as the main component; manufactured by Adeka Corp.

SI-150L a thermal acid generating agent of the so-called sulfonium salt system which includes 4-acetoxyphenyldimethylsulfonium=hexafluoroantimonate sulfonium as the main component; manufactured by Sanshin Kagaku Kogyo KK. An acid can be also generated under UV irradiation, but since sensitivity to UV is lower and the heat-induced activation is greatly stronger than those of the SP-170, this agent is referred to herein as a thermal acid generating agent.

F470: surfactant (leveling agent) manufactured by DIC, Inc.

Toluene, MEK: industrial chemicals.

TABLE 1

| Starting Material | E-CL | E-CL2 | E-CO |
|---|---|---|---|
| EHPE3150 | 62 | 62 | 12 |
| CELLOXIDE 2012P | 8 | 8 | 8 |
| Epicoat 1006FS | | | 37 |
| Epiclon 850S | 12 | 12 | 10 |
| VG3101L | | | 15 |
| EPPN201 | | | 18 |
| YP50 | 18 | 18 | |
| Epicoat YH300 | 8 | 8 | |
| SP-170 | 1 | | 1 |
| SI-150L | | 1 | |
| F470 | 0.1 | 0.1 | 0.1 |
| Toluene | 17 | 17 | 14 |
| MEK | 40 | 40 | 34 |

A-Cl for a cladding and A-Co for a core of a type curable by active energy rays (UV) were fabricated as acrylic resin varnishes. The varnishes were prepared by synthesizing polymers having carboxyl groups for the cladding and core and then compounding the polymers with various (meth)acrylic acid esters and curing initiators.

More specifically, a polymer (referred to hereinbelow as P-CO) having a carboxyl group for a core was synthesized in the below-described manner. The starting materials used are listed below.

PGMEA: propylene glycol monomethyl ether acetate (industrial reagent).

ADVN: 2,2'-azobis(2,4-dimethylvaleronitrile) (industrial reagent).

DLDBT: dibutyltin dilaurate (industrial reagent).

BHT: butyl hydroxytoluene (industrial reagent).

Imilex-C: N-cyclohexylmaleimide manufactured by Nippon Shokubai KK.

Light Ester BZ: benzyl methacrylate manufactured by Kyoeisha Chemical Co., Ltd.

MMA: methyl methacrylate manufactured by Mitsubishi Gas Chemical Co., Ltd.

MAA: methacrylic acid manufactured by Mitsubishi Gas Chemical Co., Ltd.

Karenz MOI: 2-isocyanatoethyl methacrylate manufactured by Showa Denko KK.

A total of 56 parts by mass of PGMEA was introduced under a nitrogen flow into a nitrogen-substituted flask equipped with a reflux tube, followed by heating to 65° C. Then, a premixed solution including 56 parts by mass of PGMEA, 13 parts by mass of Imilex-C, 41 parts by mass of Light Ester BZ, 10 parts by mass of MMA, 24 parts by mass of MAA, and 1.7 parts by mass of ADVN was dropwise added for 2 h, followed by reflux stirring for 3 h at 65° C. and then for 1 h at 90° C. After gradual heating to room temperature, a premixed solution including 14 parts by mass of PGMEA, 0.09 part by mass of DLDBT, and 0.1 part by mass of BHT was added and stirring was conducted while introducing the air. The system was then heated to 70° C., a premixed mixture including 12.0 parts by mass of PGMEA and 21 parts by mass of Karenz MOI was dropwise added for 30 min, reflux stirring was performed for 3 h at 70° C., and a P-CO solution (solid component 45% by mass) was obtained.

Further, a polymer (referred to hereinbelow as P-CL) having a carboxyl group for a cladding was synthesized in the following manner.

The starting materials used included 2-HEMA: ethylene glycol monomethacrylate manufactured by Mitsubishi Gas Chemical Co., Ltd. in addition of the aforementioned materials.

A total of 56 parts by mass of PGMEA was introduced under a nitrogen flow into a nitrogen-substituted flask equipped with a reflux tube, followed by heating to 65° C. Then, a premixed solution including 56 parts by mass of PGMEA, 13 parts by mass of Imilex-C, 31 parts by mass of MMA, 31 parts by mass of 2-HEMA, 14 parts by mass of MAA, and 2 parts by mass of ADVN was dropwise added for 2 h, followed by reflux stirring for 3 h at 65° C. and then for 1 h at 90° C. After gradual heating to room temperature, a premixed solution including 14 parts by mass of PGMEA, 0.09 part by mass of DLDBT, and 0.1 part by mass of BHT was added and stirring was conducted while introducing the air. The system was then heated to 70° C., a premixed mixture including 12.0 parts by mass of PGMEA and 21 parts by mass of Karenz MOI was dropwise added for 30 min, reflux stirring was performed for 3 h at 70° C., and a P-CL solution (solid component 45% by mass) was obtained.

Varnishes of the resins for an optical waveguide (A-CL for a cladding and A-CO for a core) were prepared by stirring and mixing the main components in the compositions presented in Table 2 below at a room temperature, and pressure-filtering with a PTFE membrane filter with a pore size of 1 μm. Starting materials which are used in addition to those described hereinabove are listed below.

A-9300: ethoxylated isocyanuric acid triacrylate manufactured by Shin Nakamura Chemical Co., Ltd.

A-CHD-4E: ethoxylated cyclohexane dimethanol diacrylate manufactured by Shin Nakamura Chemical Co., Ltd.

A-BPE-4: ethoxylated bisphenol A diacrylate manufactured by Shin Nakamura Chemical Co., Ltd.

A-BPE-10: ethoxylated bisphenol A diacrylate manufactured by Shin Nakamura Chemical Co., Ltd.

Irgacure 2959: a UV radical initiator of an a-hydroxyalkyl phenone system manufactured by BASF Japan Co., Ltd.

Irgacure 819: a UV radical initiator of an acylphosphine oxide system manufactured by BASF Japan Co., Ltd.

TABLE 2

| Starting Materials | A-CL | A-CO |
|---|---|---|
| P-CL solution (solid fraction) | 143 (64) | |
| P-CO solution (solid fraction) | | 143 (64) |
| A-9300 | 21 | |
| A-CHD-4E | 21 | |
| A-BPE-4 | | 21 |
| A-BPE-10 | | 21 |
| Irgacure 2959 | 1 | 1 |
| Irgacure 819 | 1 | 1 |
| PGMEA | 11 | 11 |

[Manufacture of Dry Film for Optical Waveguide]

A dry film for an optical waveguide was manufactured by applying the obtained resin varnishes to a carrier base material with a test coater with a comma coater head manufactured by Hirano Tecseed Co., Ltd., drying, bonding a protective film to the surface of the resin layer for an optical waveguide, which has thus been formed, with a laminating roller at 40° C., and winding. Three films, namely, a dry film for a lower cladding, a dry film for a core, and a dry film for an upper cladding, were used as a set and sets A to H of dry films for an optical waveguide were obtained. In the reference symbols of the dry films in Table 3, 1CL stands for the lower cladding CO—the core, and 2CL—the upper cladding.

Table 3 hereinbelow represents combinations of the carrier base materials, resin varnishes for the resin layer for an optical waveguide, and protective films (PF), the results obtained by measuring the surface roughness of the PF with the aforementioned scanning confocal laser microscope, the resin thickness after drying (units: μm), and measurement results of surface roughness SRa, SRz (units: μm) of the resin surface that appeared when the protective film (PF) was peeled off. Starting materials used in this case are listed below.

A4100: a PET film manufactured by Toyobo Co., Ltd.; the film was subjected to easy adhesion treatment on one side and was not subjected to surface treatment on the other side. The film thickness was 50 μm. The actually measured surface roughness of the film on the surface that was not subjected to surface treatment were SRa=0.03 μm and SRz=0.7 μm.

CUF: the so-called peelable copper foils constituted by a copper foil with a thickness of 18 μm (carrier copper foil) and a copper foil with a thickness of 3 μm; product number MT18SD-H3, manufactured by Mitsui Kinzoku Kogyo KK.

E-201F: an OPP film (thickness 50 μm) manufactured by Oji F-tex Co., Ltd. The surface roughness measured by the scanning confocal laser microscope was SRa=0.05 μm and SRz=0.97 μm. This film corresponds to the so-called optical film and has a roughness at a low level which cannot be referred to as a roughened surface.

SB-OPP: a film obtained by sandblasting the surface of E-201F. The surface roughness was SRa=0.15 μm and SRz=1.7 μm.

E-PI: a flexible sheet in which copper is bonded to both surfaces of polyamide, manufactured by Panasonic Corp., the copper foil on both surfaces of a product R-F775 (thickness 20 μm) was etched-off. The surface roughness was SRa=0.26 μm and SRz=2.6 μm.

YM17S: a surface-roughened OPP film (thickness 20 μm) manufactured by Toray Industries, Inc. The surface roughness was SRa=0.7 μm and SRz=7.7 μm.

E130: a surface-roughened PET film (thickness 26 μm) manufactured by Mitsubishi Resin KK. The surface roughness was SRa=0.8 μm and SRz=12 μm.

TABLE 3

| Dry film set number | Dry film number | Carrier base material | Varnish | Dry thickness | Protective film (PF) Type | SRa | SRz | PF-peeled resin surface SRa | SRz |
|---|---|---|---|---|---|---|---|---|---|
| A | A-E-1CL | A4100 | E-CL | 10 | SB-OPP | 0.15 | 1.7 | 0.11 | 1.0 |
|   | A-E-CO | A4100 | E-CO | 35 | SB-OPP | 0.15 | 1.7 | 0.12 | 1.1 |
|   | A-E-2CL | A4100 | E-CL | 45 | SB-OPP | 0.15 | 1.7 | 0.11 | 0.93 |
| B | B-E-1CL | A4100 | E-CL | 10 | YM17S | 0.74 | 7.7 | 0.50 | 3.6 |
|   | B-E-CO | A4100 | E-CO | 35 | YM17S | 0.74 | 7.7 | 0.73 | 5.4 |
|   | B-E-2CL | A4100 | E-CL | 45 | YM17S | 0.74 | 7.7 | 0.52 | 3.8 |
| C | C-E-1CL | A4100 | E-CL | 10 | E-PI | 0.26 | 2.6 | 0.12 | 1.3 |
|   | C-E-CO | A4100 | E-CO | 35 | E-PI | 0.26 | 2.6 | 0.2 | 2.1 |
|   | C-E-2CL | A4100 | E-CL | 45 | E-PI | 0.26 | 2.6 | 0.13 | 1.3 |
| D | D-E-1CL | A4100 | E-CL | 10 | E-130 | 0.80 | 12 | (0.35) | (3.8) |
|   | D-E-CO | A4100 | E-CO | 35 | E-130 | 0.80 | 12 | (0.39) | (4.1) |
|   | D-E-2CL | A4100 | E-CL | 45 | E-130 | 0.80 | 12 | (0.33) | (3.4) |
| E | A-E-1CL | A4100 | E-CL2 | 10 | SB-OPP | 0.15 | 1.7 | 0.12 | 1.1 |
|   | A-E-CO |  |  |  | Described in A-E-CO |  |  |  |  |
|   | A-E-2CL | CUF | E-CL2 | 45 | SB-OPP | 0.16 | 1.6 | 0.12 | 0.92 |
| F | F-A-1CL | A4100 | A-CL | 10 | SB-OPP | 0.15 | 1.7 | 0.1 | 0.92 |
|   | F-A-CO | A4100 | A-CO | 35 | SB-OPP | 0.15 | 1.7 | 0.11 | 1.0 |
|   | F-A-2CL | A4100 | A-CL | 45 | SB-OPP | 0.15 | 1.7 | 0.11 | 0.98 |
| G | G-E-1CL | A4100 | E-CL | 10 | E-201F | 0.06 | 0.96 | 0.07 | 0.72 |
|   | G-E-CO | A4100 | E-CO | 35 | E-201F | 0.06 | 0.96 | 0.06 | 0.81 |
|   | G-E-2CL | A4100 | E-CL | 45 | E-201F | 0.06 | 0.96 | 0.06 | 0.7 |
| H | H-A-1CL | A4100 | A-CL | 10 | E-201F | 0.06 | 0.96 | 0.06 | 0.90 |
|   | H-A-CO | A4100 | A-CO | 35 | E-201F | 0.06 | 0.96 | 0.07 | 0.77 |
|   | H-A-2CL | A4100 | A-CL | 45 | E-201F | 0.06 | 0.96 | 0.07 | 0.82 |

In all of the dry films using A4100 shown in Table 3 as a carrier base material, the resin for an optical waveguide was coated on the untreated surface of A4100 (surface that was subjected to easy adhesion treatment). In E-E-2CL using CUF as a carrier base material, the resin for an optical waveguide was coated on the surface of a copper foil with a thickness of 3 μm.

Explained below is the reason for showing in parentheses the values of SRa and SRz relating to the surface of the three dry films with the set symbol D from which the protective film (PF) was removed.

In order to peel off the protective film with the object of measuring the roughness of the resin surface for an optical waveguide which appeared when the protective film was peeled off, the protective film in the dry film corner was peeled off with a finger and then the protective film was removed from the entire surface. In the dry films with set symbols other than D, peeling could be performed between the protective film and the resin for an optical waveguide, but when such method was used in the case of the set symbol D (dry film in which E130 was used as the protective film), most of the resin for an optical waveguide remained adhered to the protective film, that is, the peeling proceeded between the carrier base material and the resin for an optical waveguide. With such a peeling method, the peeling proceeds in a state in which both the carrier base material and the protective film are curved. Therefore, where adhesion between the protective film and the resin layer for an optical waveguide is strong, a portion without the resin for an optical waveguide eventually appears on the carrier base material side. Such an effect has occurred in the dry film with the set symbol D.

To avoid such an effect, in the film with the set symbol D, a pressure-sensitive adhesive tape was bonded to a protective film corner and the protective film as peeled off from the corner portion in a state in which the carrier base material of the dry film was attached to a vacuum attachment plate and the carrier base material and the resin for an optical waveguide were maintained in a planar state. With such a method, the effect of the peeling proceeding between the carrier base material and the resin for an optical waveguide could be avoided. The vacuum attachment plate, as referred to herein, is a plate in which a large number of through holes with a diameter, for example, of 0.3 mm are formed in a flat metal plate, the film is placed thereon, suction is performed by reducing pressure from the lower side, and the film is fixed by the atmospheric pressure. With this method, since the peeling proceeds in a state in which only the protective film is bent during peeling, the peeling in most cases can proceed between the resin for an optical waveguide and the protective film even when the adhesion between the resin for an optical waveguide and the protective film is weak. However, in the dry films with the set symbol D, the resin for an optical waveguide remained at the bottom of valley portions of surface unevenness of the protective film. As a result, the roughness of the resin surface that appeared when the protective film was peeled off had a value about 40% less than the roughness of the protective film itself.

[Manufacture of Optical Waveguide]

Example 1

A substrate obtained by etching off the copper foil R1515W (copper foil 12 μm product), which is a substrate with copper bonded to both surfaces (manufactured by Panasonic Corp.), was cut to 130 mm×100 mm as a planar body 1 for fabricating an optical waveguide. The surface roughness of the substrate surface was measured by the above-described method. The results were SRa=0.81 μm and SRz=8.0 μm. The reflectance at 365 nm measured with a UV spectrophotometer was 7%. Films of the set A in Table 3 were used for the optical waveguide.

A lower cladding layer was formed by the following procedure on the substrate (planar body 1). Thus, the surface of the resin layer for an optical waveguide which appeared when the protective film was peeled off in A-E-1 CL, which was the dry film for the lower cladding obtained by cutting to 130 mm×100 mm, was arranged on the substrate, the PET films with a thickness of 75 μm (product number T60, manufactured by Toray Industries, Inc.; abbreviated hereinbelow as T60) that were cut to 200 mm×170 mm were used as the carrier films (or thermal-sheet protective films) for vacuum lamination above and below (the configuration in which the substrate and the dry film were sandwiched between the PET films with a thickness of 75 μm), the configuration obtained was held for 15 sec in a vacuum laminator (vacuum laminator of a pressurization system, manufactured by Nichigo Morten Co., Ltd.; product number V130, abbreviated hereinbelow as V130) at a heating temperature of 50° C. after a vacuum of 1 hPa (1 hectopascal; about one thousand of 1 atm) was reached, and lamination was then performed by pressurizing for 90 sec under 0.3 MPa. The carrier films (T60) for vacuum lamination were then removed, the laminate of A-E-1 CL and the substrate was heat treated (planarized) for 20 min at 120° C. and gradually cooled to room temperature. Then, irradiation with active energy rays (UV light) from an ultrahigh-pressure mercury lamp was performed from the side of the PET film, which was the carrier base material of the dry film laminate, to obtain a light quantity of 2000 mJ/cm² at 365 nm, the PET film was peeled off and removed, heat treatment was conducted for 30 min at 140° C., and the resin was cured. The surface roughness of the lower cladding was measured by the above-described method. The results were SRa=0.06 μm and SRz=0.91 μm.

A core was formed by the following procedure on the planar body in which the lower cladding layer was formed on one surface of the two-side etch-off product of R1515W obtained in such a manner. Thus, the surface of the resin layer for an optical waveguide that appeared when the protective film was peeled off in A-E-CO, which was cut as the dry film for the core to dimensions of 130 mm×100 mm, was arranged on the surface of the lower cladding layer, the T60 were arranged above and below, and lamination was performed in the V130 under the same lamination conditions as those of the lower cladding. The T60 were then removed, the PET film, which was the carrier base material of the obtained dry film laminated product, was peeled off and removed, and heating was performed for 20 min at 120° C. After the heating, the surface roughness of the resin layer for the core which was gradually cooled to room temperature was measured by the above-described method. The results were SRa=0.05 μm and SRz=0.83 μm.

The core was then patterned in the following manner. Thus, the resin for the core was irradiated with active energy rays (UV light) from an ultrahigh-pressure mercury lamp to obtain a light quantity of 2000 mJ/cm² at 365 nm through the so called glass chromium mask (negative-type mask in which a portion that is to serve as the core is an opening) which was made from glass having 12 optical waveguide cores with a width of 35μ, a pitch of 125 μm, and a length of 110 mm and had a thin chromium film in a shielding layer, followed by heat treatment for 15 min at 140° C. The unexposed portion of the resin for the core was then dissolved and removed by development using an aqueous flux cleaning agent (Pine Alpha ST-100SX, manufactured by Arakawa Chemical Industries Co.) adjusted to 55° C. and washed with water. Moisture was then removed from the surface with an air blower and then by drying for 10 min at 100° C. As a result, a planar body with a core pattern formed on the lower cladding was obtained.

The upper cladding was then formed on the planar body by the following procedure. The surface of the resin layer for an optical waveguide that appeared when the protective film was peeled off in A-E-2CL, which was cut as the dry film for the upper cladding to dimensions of 130 mm×100 mm, was arranged on the surface of the planar body where the core was formed, the T60 were arranged above and below, the configuration obtained was held for 30 sec in the V130 at a heating temperature of 80° C. after a vacuum of not higher than 1 hPa was reached, and lamination was then performed by pressurization for 120 sec under 0.3 MPa. The T60 were then removed, the PET film, which was the carrier base material of the obtained dry film laminate, was peeled off and removed, and heat treatment was performed for 30 min at 140° C., followed by gradual cooling to room temperature. Then, the cladding resin side was irradiated with active energy rays (UV light) from an ultrahigh-pressure mercury lamp to obtain a light quantity of 2000 mJ/cm² at 365 nm, heat treatment was performed for 30 min at 140° C., curing of the resin was completed, and a sample in which an optical waveguide was formed on the laminate for an electric substrate was fabricated. The surface roughness of the resin layer for the upper cladding was measured by the above-described method before the UV exposure. The results were SRa=0.06 μm and SRz=1.0 μm.

A total of three substrates with the optical waveguides were fabricated and the optical waveguides obtained were evaluated in the following manner. The results are shown in Table 4.

(Observation of Voids)

Voids (air bubbles) in the core and claddings were observed visually and with an optical microscope from vertically above the optical waveguide surface. The following symbols were used for evaluation of one substrate with the optical waveguide: Very good—no voids with a diameter equal to or greater than 5 μm were observed; Good—1 to 5 such voids were present in the surface; Fair—6 to 20 such voids were present; Poor—more than 20 such voids were present.

(Average Waveguide Loss)

The substrates with the optical waveguides were cut with a dicing blade perpendicular to the core extension direction to obtain a core length of 100 mm, and samples with a core length of 100 mm were obtained. The waveguide loss of the samples was measured, with the light power (P1) as a parameter, by using a laser diode with a wavelength of 850 nm as a light source, connecting the end portion of an optical fiber with a core diameter of 10 μm and a NA of 0.21 to one end of the optical waveguide core through silicone oil as a matching oil, and connecting the end portion of an optical fiber with a core diameter of 200 μm and a NA of 0.4 to the other end of the optical waveguide core through the matching oil. The measurements were also conducted, with the light power (P0) in a state without the optical waveguide, by abutting the end surfaces of the two optical fibers against each other through the matching oil. The optical waveguide loss was determined from the computational formula of −10 log(P1/P0), and the waveguide loss (units; dB/cm) for a single optical waveguide was measured by dividing the result by the optical waveguide length of 10 cm. The measurements were performed with respect to three substrates with the optical waveguides which had 12 optical waveguide cores per 1 substrate, and an average waveguide loss of a total of 36 optical waveguide cores was calculated.

(Defect Ratio)

An optical waveguide core with the waveguide loss above 0.1 dB/cm was assumed to be defective, and a value obtained by dividing the number of defective core by 36 and representing the result in percentage was determined as a defect ratio.

In Example 1, the average waveguide loss was 0.054 dB/cm and the defect ratio was 0% (no defective cores)

TABLE 4

| | Dry film set number | Observation of voids | Average waveguide loss | Defect ratio |
|---|---|---|---|---|
| Example 1 | A | Very Good | 0.054 | 0% |
| Example 2 | B | Very Good | 0.061 | 0% |
| Example 3 | C | Very Good | 0.059 | 0% |
| Example 4 | D | Fair | 0.086 | 25% |
| Example 5 | E | Good | 0.062 | 0% |
| Example 6 | F | Good | 0.072 | 6% |
| Comparative Example 1 | G | Poor | 0.14 | 92% |
| Comparative Example 2 | H | Poor | 0.17 | 97% |

Examples 2 to 6, Comparative Examples 1 and 2

The fabrication and evaluation were performed in the same manner as in Example 1 by using the dry film sets B to H for an optical waveguide depicted in Table 3. The results are shown in Table 4.

The contents of the operations performed under conditions different from the optical waveguide formation conditions of Example 1 are described below.

Example 4

When the protective films of the dry film set D, that is, D-E-1CL, D-E-CO, and D-E-2CL, were peeled off, the carrier base material of the dry film was attached to a vacuum attachment plate to obtain the planar state of the carrier base material and the resin for an optical waveguide, a pressure-sensitive adhesive tape was pasted to the protective film corner, and the protective film was peeled off from the corner portion. Where the dry films of the sets other than the set D were peeled off, the protective film in the corner portion of the cut dry film was peeled off with a finger to provide a peeling start point, and then the protective film and carrier base material provided with the resin for an optical waveguide could be easily peeled off. However, where such a method was used with the dry film of the set number D, part of the film for an optical waveguide adhered to the protective film and could not be used. For this reason, the vacuum attachment plate was used.

Example 5

The dry film E-E-2CL is a resin of a thermosetting type for a cladding. Therefore, the upper cladding is to be cured under different conditions. A sample was fabricated by laminating the upper cladding, then heating for 30 min at 140° C., then curing by heating for 1 h at 160° C., forming an optical waveguide on the laminated plate for an electric substrate, and forming a copper foil on the surface thereof. Then, the carrier copper foil (thickness 18 μm) of the carrier base material CUF was peeled off and removed, the copper foil with a thickness of 3 μm which was bonded to the upper cladding layer was exposed through a masking pattern, which was produced with an etching resist, and developed to form an electric circuit, and copper plating was performed to obtain a copper layer with a thickness of 12 μm. The evaluation of loss in the sample was performed in the same manner as in Example 1, but voids in the optical waveguide were observed by removing the copper circuit by etching, laminating and curing the A-E-1CL, under the same conditions as were used when the lower cladding was formed with A-E-1CL in Example 5, on the resin surface roughened to a replica shape of copper foil anchors, and flattening the surface. A sample other than that used for the observation of voids and evaluation of loss was plated to adjust the copper layer thickness to 12 μm, and the peel strength of the copper foil was measured. The result was 0.69 N/mm.

Example 6 and Comparative Example 2

The lamination conditions of the dry films of the set number F, that is, F-A-1CL, F-A-CO, and F-A-2CL, and of the set number H, that is, H-A-1Cl, H-A-CO, and H-A-2Cl, were different from those of other dry films. Since the resin for an optical waveguide is of a radical curing type, the curing is inhibited by oxygen. For this reason, curing conditions are also different. Furthermore, since the resin is of an acrylic resin system having carboxyl groups, the development conditions are also different. The lamination conditions of F-A-1CL and H-A-1Cl included holding for 15 sec at a heating temperature of 65° C. in the V130 after vacuum with a pressure equal to or lower than 1 hPa was reached, and then pressurizing for 60 sec under 0.3 MPa. As for the conditions leading to the subsequent curing, heating was conducted for 15 min at 140° C. while leaving, without peeling off, the PET film which was the carrier base material of the obtained dry film laminated product, gradual cooling was performed to room temperature, the carrier base material side was then irradiated with active energy rays (UV light) from an ultrahigh-pressure mercury lamp such as to obtain a light quantity of 2000 mJ/cm$^2$ at 365 nm, the PET film of the carrier base material was peeled off and removed, and heat treatment was then conducted for 30 min at 160° C. to complete the curing of the resin. The lamination conditions of F-A-CO and H-A-CO were the same as those of H-A-1CL and H-A-1CL of the lower cladding. The conditions of the subsequent core formation included heating (planarization) for 20 min at 120° C. while leaving the PET film which was the carrier base material of the obtained dry film laminated product, then irradiating the core resin side with active energy rays (UV light) from an ultrahigh-pressure mercury lamp such as to obtain a light quantity of 1500 mJ/cm$^2$ at 365 nm, peeling off and removing the carrier base material, dissolving and removing the unexposed portions of the resin for the core by development with an aqueous solution of sodium carbonate with a concentration of 1% by mass, cleaning with an aqueous solution of sulfuric acid with a concentration of 0.5% by mass, then washing with water, removing the moisture present on the surface by air blowing, drying for 10 min at 100° C., then irradiating with the aforementioned UV light at a light quantity of 1000 mJ/cm$^2$ at 365 nm, and further heating for 30 min at 150° C. to form a core pattern on the lower cladding. The conditions for forming F-A-2CL and H-A-2Cl involved holding for 15 sec at a heating temperature of 90° C. in the V130 after vacuum with a pressure equal to or lower than 1 hPa reached, and then pressurizing for 90 sec under 0.3 MPa. Then, heating was conducted for 15 min at 140° C. while leaving, without peeling off, the PET film which was the carrier base material of the obtained dry film laminated product, irradiation with the above-described UV light was then performed from the carrier base material side such as to obtain a light quantity of 2000 mJ/cm$^2$ at 365 nm, the PET film of the carrier base material was peeled off and removed, and heat treatment was then conducted for 30 min at 160° C. to complete the curing of the resin.

The results obtained in Examples 1 to 6 and Comparative Examples 1 and 2 indicate that where the surface of the protective film which is in contact with the resin for an optical waveguide is a roughened surface, the average loss in the obtained optical waveguide and the defect ratio of the optical waveguides can be reduced. Further, where the surface roughness is SRa=0.1 μm to 1 μm and SRz=1 μm to 10 μm, the protective film can be easily peeled off and the average loss and defect ratio of the optical waveguides can be further reduced. Furthermore, by using a metal foil (copper foil) as the carrier base material for the upper cladding, it is possible to form a copper circuit directly on the upper cladding.

In the present example, the etch-off product of a substrate with a copper foil on both side was used as the planar body, but an optical-electrical composite wiring board can be also obtained by using a multilayer wiring board on which an electric circuit is formed and which also has a pattern (alignment mark) having a function for specifying the position where the optical waveguide core is to be formed.

Example 7

A production example of a flexible optical waveguide of a structure in which flexible films are disposed on both surfaces of the optical waveguide involves forming a lower cladding layer on a PET film, forming a core on the cladding surface, forming an upper cladding thereon and simultaneously completing bonding with the PET film and curing.

This example is different from the above-described examples in that the carrier base material that is to be in contact with the material for cladding is used in a state of being strongly bonded to the cladding layer as a film for eventually protecting and reinforcing the flexible optical waveguide. Therefore, although the material for the lower cladding in the present example is in the dry film form, since the carrier base material is used as is, that is, without being peeled off and removed, the material for the lower cladding is not laminated on the planar body. For this reason, in order to clarify the difference with the dry film of the present invention that is used by laminating on the planar body, the material for the lower cladding of the present example is referred to as a film-equipped lower cladding, rather than the dry film.

A film-equipped lower cladding (resin layer with a thickness of 10 μm for an optical waveguide) was obtained by coating and drying the varnish E-CL on the easy-adhesion surface of A4100 when the varnish was coated on A4100 in the manufacture of the A-E-1CL used in Example 1, and then laminating the protective film E-201F. Further, a dry film I-E-2CL (resin layer with a thickness of 45 μm for an optical waveguide) was fabricated by the manufacturing process same as that in the case of A-E-2CL in the manufacture of the A-E-2CL used in Example 1, except that when the varnish E-CL was coated on A4100, the varnish was coated and dried on the easy-adhesion surface of A4100.

A strongly adhesive surface of a two-side adhesive tape (manufactured by Teraoka Seisakusho Co., Ltd., product number 7692; adhesive layer thickness is 47 μm, tackiness of the strongly adhesive surface is 8.8 N/25 mm, tackiness of the weakly adhesive surface is 0.5 N/25 mm) that was cut to a size of 130 mm (length)×100 mm (width) was disposed on a glass plate of the same size and a thickness of 1 mm, lamination was performed with the vacuum laminator V130 under the same conditions as during the lamination of the A-E-1 CL in Example 1, the PET surface of the film-equipped lower cladding that was cut to a size of 130 mm×100 mm was then disposed on the weakly adhesive surface that appeared when the peeling paper of the second surface of the two-side adhesive tape was peeled off, and vacuum lamination was performed under the same conditions as those of the lamination of glass and 7692. The protective film E-201F was peeled off and removed from the film-equipped lower cladding bonded to the glass plate, heating (planarization) was performed for 15 min at 140° C., gradual cooling was performed to room temperature, irradiation with active energy rays (UV light) from an ultrahigh-pressure mercury lamp was then performed at a light quantity of 2000 mJ/cm$^2$ at 365 nm, and heat treatment was then performed for 30 min at 140° C. to complete the curing of the resin. The roughness of the resin surface was measured, and the results were SRa=0.05 μm and SRz=0.78 μm. The body thus obtained in which the lower cladding surface is present on the surface is a planar body for subsequent lamination of the dry film (A-E-CO) for a core.

A core was formed on the planar body under the same conditions as those of the formation of core in Example 1. An upper cladding was formed on the planar body on which the core was formed. The upper cladding was obtained by using the dry film I-E-2CL for a cladding, performing the operations from lamination to UV exposure under the conditions same as those used when the upper cladding was formed in Example 1, and heat treating for 30 min at 150° C., without peeling the A4100, which was the carrier base material, to complete the curing of the resin.

A notch was then introduced into the flexible optical waveguide which was a composite constituted by PET film—optical waveguide layer—PET film with a dicing blade to 5 μm of the interface of the two-side adhesive tape and PET (position at which a 5-μm cutting edge penetrated into the two-side adhesive tape) to obtain a core length of 100 mm from the optical waveguide side in the direction perpendicular to the stretching direction of the core. Peeling was then performed between the PET film and the weakly adhesive surface of the two-side adhesive tape, and a flexible optical waveguide with an optical waveguide core length of 10 cm was then obtained in which the PET film, as a reinforcing layer, was disposed on and bonded to both surfaces of the optical waveguide layer.

A total of three workpieces fabricated in the same manner as in Example 1 were evaluated. When voids in the flexible optical waveguide were observed by the above-described method, no voids could be found, and the evaluation was "Very Good". The waveguide loss evaluation was performed in the same manner as in Example 1 by fixing the flexible optical waveguide with a width (optical waveguide length) of 100 mm to a structure with a width of 98 mm. The following results were obtained: the average waveguide loss was 0.068 dB/cm and the defect ratio was 0%.

In the present example, flexible optical waveguides with a very low loss can be manufactured at a high yield, and flexible transmission paths with a high core density, which can transmit optical information between boards accommodated on a rack, such as a server, a router, and a supercomputer, by arranging connectors for optical fibers at both ends, can be realized at a low cost.

Example 8

In Example 8, an optical waveguide alone was obtained by peeling off an optical waveguide formed on a peelable temporary substrate.

A polycarbonate (PC) plate having a thickness of 1 mm and including no UV absorber was cut to a size of 130 mm×100 mm as a planar body for fabricating an optical waveguide. When the surface roughness of the PC plate was measured by the above-described method, the following results were obtained: SRa=0.06 μm and SRz=0.92 μm. A lower cladding was formed by processing the A-E-1CL, which was the dry film for a lower cladding, on the substrate (planar body 4) under the same conditions as in Example 1. When the surface roughness of the lower cladding was measured by the above-described method, the following results were obtained: SRa=0.05 μm and SRz=0.75 The obtained planar body in which the lower cladding layer was formed on the PC plate was used for subsequent core formation.

Then, the A-E-CO, which was the dry film for a core, was laminated and heat treated, under the same conditions as in Example 1, on the planar body on which the lower cladding layer was formed. When the surface roughness of the resin layer for a core was measured by the above-described method, the following results were obtained: SRa=0.06 μm and SRz=0.87 μm.

The core patterning was then performed in the same manner as in Example 1, and an upper cladding was formed using the dry film A-E-2Cl as the upper cladding, under the same conditions as in Example 1, on the planar body on which the core was formed.

The obtained optical waveguide which was formed on the PC plate was then cut at a position of a core length of 10 cm with the dicing blade in the same manner as in Example 7 to a position at which the 5 μm edge of the blade penetrated into the PC plate, and a notch was introduced into the optical waveguide layer. A pressure-sensitive adhesive tape was bonded to the optical waveguide surface, the PC plate and the optical waveguide were peeled off by lifting the tape, and a film including only the optical waveguide was obtained. The film was evaluated in the same manner as in Example 7 and the following results were obtained. No voids could be observed, and the evaluation was "Very Good". The average value of the waveguide loss was 0.064 dB/cm and the defect ratio was 0%.

According to the present example, a low-loss optical waveguide film of a very small thickness which is composed only of the upper and lower claddings and the core can be manufactured at a high yield. Further, an optical transmission element for performing high-density transmission of optical information between the boards can be obtained by mounting optical connectors on both ends of the core.

This application is based on Japanese Patent Application No. 2013-202046 filed on Sep. 27, 2013, and the contents thereof are incorporated in the present application.

The present invention has been adequately and sufficiently explained hereinabove on the basis of the embodiments and with reference to the drawings, but it should be recognized that a person skilled in the art can easily change and/or modify the embodiments. Therefore, the embodiments changed or modified by a person skilled in the art are intended to be included in the scope of the claims, provided that the changed embodiments and modified embodiments do not depart from the scope of the claims.

INDUSTRIAL APPLICABILITY

The present invention has broad industrial applicability in the technical fields of optical waveguides, manufacturing methods therefor, and dry films for optical waveguides.

The invention claimed is:

1. A dry film for an optical waveguide comprising:
   a carrier base material (A);
   a resin layer (B) for the optical waveguide that is non-cured, curable by active energy ray or heat and is in contact with the carrier base material (A); and
   a protective film (C), wherein
   a surface of the protective film (C) that is in contact with a surface of the resin layer (B) for the optical waveguide is a roughened surface, and
   the carrier base material is removable from the resin layer (B).

2. The dry film for the optical waveguide according to claim 1, wherein
   the carrier base material (A) is one of a resin film or a metal foil, the protective film (C) is a thermoplastic resin film, and a roughness of the roughened surface of the protective film (C) is 0.1 µm to 1 µm as an arithmetic average roughness (SRa) and 1 µm to 10 µm as a ten-point average roughness (SRz).

3. The dry film for the optical waveguide according to claim 1, wherein
the resin layer (B) for the optical waveguide includes a compound having an epoxy group, and a photocuring initiator that is configured to cause curing by inducing a reaction of the epoxy group of the compound by irradiation with active energy rays.

4. The dry film for the optical waveguide according to claim 1, wherein
the resin layer (B) for the optical waveguide includes a compound having an ethylenic double bond and a photocuring initiator configured to cause curing by inducing a reaction of the ethylenic double bond of the compound by irradiation with active energy rays.

5. A method for manufacturing an optical waveguide in use of the dry film for the optical waveguide according to claim 1,
the method comprising the following steps performed in order:
providing the dry film according to claim 1;
preparing a planar body (D);
peeling off the protective film (C) of the dry film to define a roughened surface of the resin layer (B);
bringing the roughened surface of the resin layer (B) and a surface of the planar body (D) into contact with each other;
bonding the resin layer (B) and the planar body (D) together by heating and pressurizing under vacuum; and
curing at least a part of the surface of the bonded resin layer (B) with active energy rays or heat.

6. The method for manufacturing the optical waveguide according to claim 5, wherein
the planar body (D) is one of a substrate for electric wiring or a substrate for electric wiring on which optical waveguide constituent members are formed.

7. The method for manufacturing the optical waveguide according to claim 5, wherein
the planar body (D) is one of a bendable film-shaped material which includes no electric wiring or in which no electric wiring is to be eventually formed, or a bendable film-shaped material on which constituent members of an optical waveguide are formed.

8. The method for manufacturing the optical waveguide according to claim 5, wherein
the planar body (D) is one of a metal foil or a metal foil on which constituent members of an optical waveguide are formed.

9. The method for manufacturing the optical waveguide according to claim 5, wherein
the planar body (D) is one of a temporary substrate that is peelable from an optical waveguide layer after at least part of the optical waveguide is formed, or the temporary substrate on which the constituent members of the optical waveguide are formed.

10. An optical waveguide manufactured by the method according to claim 5, wherein
the optical waveguide is one of a substrate or a member including the optical waveguide and has an information transmission function.

11. The dry film for the optical waveguide according to claim 1, wherein
an adhesion between the protective film (C) and the resin layer (B) is less than an adhesion between the resin layer (B) and the carrier base material (A).

12. The method for manufacturing the optical waveguide according to claim 5, wherein
a roughness of the roughened surface of the resin layer (B) after bonding with the planar body (D) is different from a roughness of the roughened surface of the resin layer (B) before bonding with the planar body (D) such that when the resin layer (B) and the planar body (D) are bonded the roughened surface of the resin layer (B) is substantially the same as the surface of the planar body (D) to which it is bonded.

* * * * *